United States Patent
Ly et al.

(10) Patent No.: US 12,314,236 B2
(45) Date of Patent: May 27, 2025

(54) AUTOMATIC GENERATION OF LABELED DATA IN IoT SYSTEMS

(71) Applicant: CONVIDA WIRELESS, LLC, Wilmington, DE (US)

(72) Inventors: Quang Ly, North Wales, PA (US); Lu Liu, Conshohocken, PA (US); Dale N. Seed, Allentown, PA (US); Zhuo Chen, Claymont, DE (US); William Robert Flynn, IV, Schwenksville, PA (US); Catalina Mihaela Mladin, Hatboro, PA (US); Jiwan L. Ninglekhu, Royersford, PA (US); Hongkun Li, Malvern, PA (US); Rocco Di Girolamo, Laval (CA)

(73) Assignee: Convida Wireless, LLC, Wilmington, DE (US)

( * ) Notice: Subject to any disclaimer, the term of this patent is extended or adjusted under 35 U.S.C. 154(b) by 528 days.

(21) Appl. No.: 17/599,200

(22) PCT Filed: Mar. 30, 2020

(86) PCT No.: PCT/US2020/025641
§ 371 (c)(1),
(2) Date: Sep. 28, 2021

(87) PCT Pub. No.: WO2020/205693
PCT Pub. Date: Oct. 8, 2020

(65) Prior Publication Data
US 2022/0156235 A1  May 19, 2022

Related U.S. Application Data

(60) Provisional application No. 62/827,475, filed on Apr. 1, 2019.

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC .......................... G06F 16/215; G06F 16/2365
See application file for complete search history.

(56) References Cited

U.S. PATENT DOCUMENTS

| | | | | |
|---|---|---|---|---|
| 2013/0262406 A1* | 10/2013 | Kumar | .................. | G06F 16/215 707/692 |
| 2016/0170980 A1* | 6/2016 | Stadnisky | ............... | H04L 67/06 707/693 |

(Continued)

FOREIGN PATENT DOCUMENTS

| | | |
|---|---|---|
| CN | 107809766 A | 3/2018 |
| CN | 108027911 A | 5/2018 |
| CN | 109328448 A | 2/2019 |

OTHER PUBLICATIONS

Eklund, Martin. "Comparing feature extraction methods and effects of pre-processing methods for multi-label classification of textual data." (2018).*

(Continued)

*Primary Examiner* — Nan Hutton
(74) *Attorney, Agent, or Firm* — BakerHostetler

(57) ABSTRACT

A labeled data generation service provides an Internet-of-Things (IoT) system with a capability whereby users may configure how the system gathers, processes, and generates labeled data instances by: collecting and processing the data into a format required by supervised learning algorithms; generating expected outputs from data available in the IoT system; supporting the linking of collected inputs with (Continued)

generated expected outputs; forming labeled data instances; cleaning the labeled data set appropriately; sending the labeled data set to target nodes; and/or communicating with target nodes regarding improving the data processing and labeling processes, as required.

20 Claims, 17 Drawing Sheets

(56) References Cited

U.S. PATENT DOCUMENTS

| | | | |
|---|---|---|---|
| 2017/0032277 A1* | 2/2017 | Klinger | G06N 5/04 |
| 2017/0032281 A1 | 2/2017 | Hsu | |
| 2017/0359362 A1 | 12/2017 | Kashi et al. | |
| 2018/0314914 A1* | 11/2018 | Kuriyama | G06F 18/2135 |
| 2019/0370687 A1* | 12/2019 | Pezzillo | H04L 67/10 |
| 2019/0378619 A1* | 12/2019 | Meyer | G16H 50/70 |
| 2020/0158810 A1* | 5/2020 | Zhang | G01S 5/0278 |
| 2022/0101337 A1* | 3/2022 | Kashibuchi | G06F 11/36 |

OTHER PUBLICATIONS

Kotsiantis, Sotiris B., Dimitris Kanellopoulos, and Panagiotis E. Pintelas. "Data preprocessing for supervised leaning." International journal of computer science 1.2 (2006): 111-117.*

Maharana, Kiran, Surajit Mondal, and Bhushankumar Nemade. "A review: Data pre-processing and data augmentation techniques." Global Transitions Proceedings 3.1 (2022): 91-99.*

Daniel Gutierrez, "Labeled Training Sets for Machine Learning", insideBIGDATA, Mar. 7, 2019, 4 pages.

Mahdavinejad et al., "Machine learning for Internet of Things data analysis: A survey", Digital Communications and Networks, 2017, 56 pages.

Sezer et al., "Context-Aware Computing, Learning, and Big Data in Internet of Things: A Survey", IEEE Internet of Things Journal, vol. 5(1), Feb. 2018, pp. 1-27.

Wikipedia et al., "Labeled data", available online at <https://en.wikipedia.org/w/index.php?t%20itle=Labeled%20data&oldid=857071684>, Aug. 29, 2018, 1 page.

OneM2M TS-0001, Functional Architecture, V3.12.0, 2018.

"Introduction to Machine Learning Contents", Retrieved from https://www.datascienceassn.org/sites/default/files/Introduction%20to%20Machine%20Learning.pdf, Jul. 13, 2015, pp. 1-146.

* cited by examiner

| Data Instance ID | | Input1 | | Input2 | | Expected Output1 | |
|---|---|---|---|---|---|---|---|
| ID | Time | inData1 | Time1 | inData2 | Time2 | outData1 | Time3 |

Figure 6

Labeled Data Configuration

Target Node:

Data Set URI:

| # Instances: | Data Source: |
| # Inputs: | # Outputs: |
| Input1: | Output1: |
| Input2: | Output2: |
| Input3: | Output3: |
| Input4: | ( New Output ) |
| Input5: | |
| ( New Input ) | |

Activate:                    ( Send )

Figure 13

AUTOMATIC GENERATION OF LABELED DATA IN IoT SYSTEMS

CROSS-REFERENCE TO RELATED APPLICATIONS

This application is the National Stage Application of International Patent Application No. PCT/US2020/025641, filed Mar. 30, 2020, which claims the benefit of U.S. Provisional Application No. 62/827,475, filed on Apr. 1, 2019, titled "Generation of Labeled Data in IoT Systems," the content of which is hereby incorporated by reference in its entirety.

BACKGROUND

This disclosure pertains to the management of labeled data in Internet-of-Things (IoT), machine-to-machine (M2M), and Web-of-Things (WoT) environments, including environments described in, for example, in the oneM2M TS-0001, Functional Architecture, V3.12.0.

SUMMARY

An apparatus, such as a server or a group of servers in an IoT, M2M, or WoT environment, may facilitate the creation of a machine learning training set by collecting data inputs and associated expected outputs into labeled data instances, and forming labeled data sets made up of many labeled data instances. Such an apparatus is in an advantageous position to acquire data from a wide variety of devices. The apparatus may be programmed with a desired configuration for the kinds of data source devices, input data, and expected outputs to acquire for a labeled data, without the configuration necessarily stipulating which specific devices to gather information from, or how to convert such acquired data from each end device. Rather, a configuration need only describe, for example, what kinds of data should be gathered, how it should be associated, and what limits should be applied in cleaning the associated data for presentation to a machine learning repository. The apparatus may automatically collect, process, scale, and clean data to produce a usable labeled data set.

For example, the operations of the apparatus may include first maintaining a configuration pertaining to the automatic creation of a labeled data set, where the labeled data set is made up of many labeled data instances, and each labeled data instance contains a plurality of data values including both data inputs and expected outputs associated with one or more data inputs. In short, the configuration may comprise a design of the labeled data set, and the apparatus may be configured to gather and associate the data to create the labeled set. The apparatus may create the labeled data set according to the configuration by acquiring a plurality of raw data inputs from data source devices, processing the raw data inputs to create processed data values, and storing the processed data values in the labeled data instances. Once a labeled set has been created, the apparatus may send the labeled data set, for example, to a machine learning repository. The machine learning repository may then be drawn upon in the training of a machine learning model or application.

Advantageously, the apparatus may process raw data inputs taken from a wide variety of IoT end devices in a number of ways to create processed data values for use in the labeled data set. This may involve converting or scaling each raw data input into a numeric form or unit of measure that is required by the configuration of the labeled data set. For example, the apparatus may have knowledge of output formats of a variety of IoT devices, and therefore be able to interpret such outputs to be used in the labeled set, even though the configuration of the labeled set does not itself contain such conversion information.

The apparatus may perform complex mathematics on its inputs, freeing end IoT devices of such computational burdens. For example, the apparatus may scale data inputs or expected outputs according to one or more statistical observations of a set of raw data inputs. For example, the apparatus may fit each of the data inputs or expected outputs on a normalized linear or logarithmic scale that spans a set of raw data inputs.

Similarly, the apparatus may create individual processed data points from one or more statistical observations of a set of raw data inputs. For example, the apparatus may record the mean, average, or standard deviation of a set of inputs or expected outputs.

The apparatus may advantageously clean the labeled data set in a number of ways prior to sending the labeled data set to the machine learning repository. This may involve, for example, identifying duplicate labeled data instances in the labeled data set, and then either removing the duplicates or informing the machine learning repository of the identity, number, or frequency of the duplications. Similarly, the apparatus may clean the labeled data set by identifying an individual datum or labeled data instance that falls outside of an expected or tolerated range, and then either remove the out-of-range datum or labeled data instance from the set, or inform the machine learning repository of the location, number, or frequency of the out-of-range values or labeled data instances.

Similarly, the apparatus may be configured to check the labeled data set for conflicting labeled data instances, e.g., where conflicting expected outputs are found for identical or similar inputs. Again, the apparatus may remove such conflicting labeled data instances, or inform in the machine learning repository of the location, number, or frequency of such conflicts.

The apparatus may operate iteratively with the machine learning (ML) model or application in creating and maintaining a labeled data set. For example, if the apparatus encounters a set of input data for which the expected output is unclear, the apparatus may consult the ML node for assistance in labeling the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 6 shows an example labeled data instance format.

FIG. 13 illustrates an example graphical user interface.

DETAILED DESCRIPTION

Figure 1:
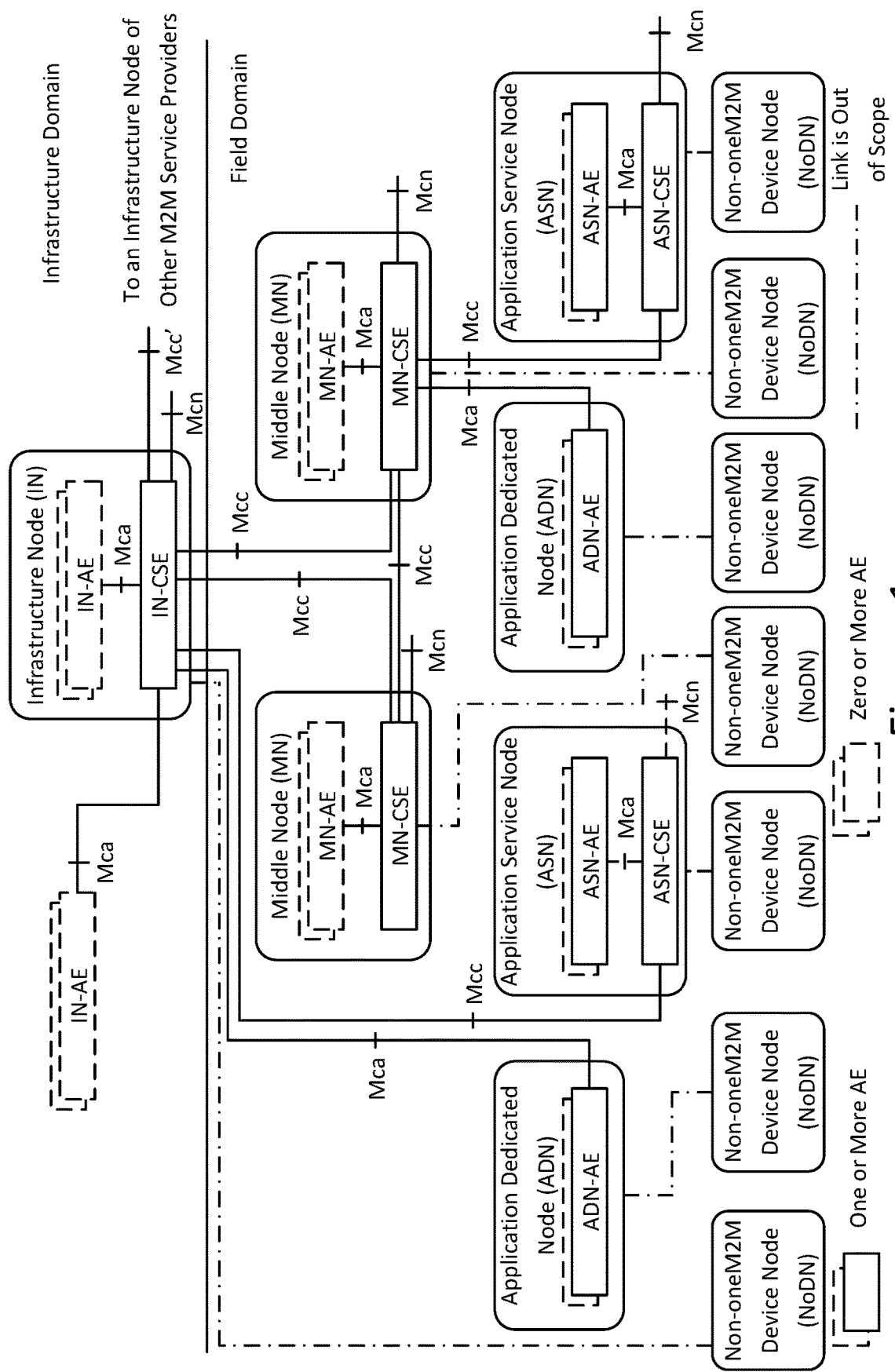
FIG. 1 illustrates an example distributed oneM2M architecture.

IoT technology may be combined with supervised learning to produce more advanced applications reaping the benefits of both. IoT technology offers a distributed means to gather data from various independent sources and may then automatically generate labeled data for use in machine learning. Using the techniques described herein, users may provide domain knowledge to configure one or more IoT servers to act as a data labeling system to gather and generate labeled data for a particular application. The resulting labeled data set may then be used for training supervised learning algorithms to develop a model that then predicts future outputs.

For example, an IoT data labeling system may support generating the labeled data set through a Labeled Data Generation Service, which includes functionalities such as: providing a capability where users may configure information on how the IoT data labeling system may gather, process, and generate labeled data instances; collecting and processing the data into a format required by supervised learning algorithms; generating expected outputs from data available in the IoT data labeling system; supporting the linking of collected inputs with generated expected outputs; forming labeled data instances and sending it to a target node, such as a machine learning repository, either singly or in a labeled data set with many labeled data instances; cleaning the labeled data set appropriately; and communicating with the target node for information to improve the data processing and labeling process as may be necessary.

An IoT node may be configured to implement operations such as: receiving a request to create a resource that contains configuration data on how to generate labeled data instances where the configuration data provides information on how to collect and process data for the labeled data instance; collecting data when they are available and preprocessing and transforming the data as necessary; monitoring for future data that are linked to collected input data; generating labeled data based on the future data; linking generated labeled data to previously collected input data; cleaning the labeled data set if appropriate; and sending available labeled data instances to a second network node.

For example, an IoT data configuration resource may include the URI of a target node, a list of inputs, a list of labeled data expressions, a list of data extraction indicators, a list of pre-processing and data transformation functions, and any combination thereof. The data to be collected may originate from one or more other resources or devices of the IoT system.

The work of creating a labeled data set may be divided among a number of physical devices. For example, a first server may collect input data as it becomes available. A second server may process or transform the data. A third server may generate labeled data in accordance with a data configuration resource. A fourth server may annotate the labeled data. Similarly, the functions may be divided into different resources residing on one or more servers.

Table 0 of the Appendix lists many abbreviations used herein.

Herein, the term "labeled data set" generally refers to a set of data that contains both inputs and expected outputs used to train a supervised learning algorithm. A "labeled data instance" refers to one of the combination of inputs and expected outputs within a labeled data set. The expected outputs are also known as "labels".

Herein, the terms "supervised learning" and "supervised machine learning" generally refer to a process in which machines learn of a desired function based on a provided labeled data set. Supervised learning may be described as training the supervised learning algorithm, Two main forms of supervised learning are classification and regression. Classification problems predict outputs that are categorical in nature, while regression problems predict outputs that are continuous or numerical in nature.

Herein, the term "supervised learning model" generally refers to an entity generated by training a supervised learning algorithm that is deployed to predict or classify new data.

Supervised Machine Learning

In supervised learning, a machine "learns" by uncovering a previously unknown function that maps inputs to outputs based on a given input-to-output relationship that is provided by labeled data. The labeled data, or training data, is thereby used to train a supervised learning algorithm to discover the desired function. To do this, during the training process, the supervised learning algorithm adjusts internal weights and biases used by the algorithm. As more training data is provided, the algorithm learns more about the input-to-output relationship, and thereby improves its prediction capability. Once trained, the supervised learning model is then able to process new input data and predict outputs, according to how it was trained.

Supervised learning includes classification and regression problems. Classification problems relate to the identification of a discrete output category in which a set of inputs belongs. Examples of classification problems include identifying whether: an email is spam or not spam; a picture is of a dog, cat, or bird; and a handwritten image is an Arabic numeral (0-9).

Regression problems relate to estimating a numerical value for a continuous quantity, e.g., price, temperature, population, time, etc. Examples include predicting home prices, city populations, and estimated arrival times.

The availability of labeled data for training the supervised learning algorithm is key to developing a successful supervised learning model. The labeled data set may consist of many thousands or millions of labeled data instances to fully represent the desired function that is to be uncovered. Traditionally, the labeled data set is generated by domain experts—people with knowledge of the requirements for the machine learning problem. Using the techniques described herein, domain experts may instead provide a configuration for a labeled data set to a system, such as an IoT system, whereby the configuration identifies sets of inputs to be gathered, and the outputs to be associated with each set of inputs. The system may then collect the inputs and outputs from various independent sources and organize them into individual labeled data instances, which are collected by the system into a comprehensive labeled data set.

Internet of Things (IoT)

The Internet of Things is an emerging technology that aims to bring devices from many industry verticals together into a horizontal system. Applications and devices are then able to communicate with each other and offer new and advanced services. From a user's perspective, data from a combination of sources may be used together to create more enriching applications even though the data may not be related to each other in their respective functions.

In addition, IoT systems offer a distributive architecture, where numerous nodes are interconnected over a dispersed network to support a plethora of device types. As a result, massive amounts of data may be generated and made available for use in wide ranging applications. Standards developing organizations such as OneM2M offer a common language where devices of various types can communicate with each other. FIG. 1 shows a distributed IoT architecture such as OneM2M in which IoT servers termed Common Services Entities (CSEs) are interconnected with each other. IoT devices termed Application Dedicated Nodes (ADNs) or non-OneM2M Device Nodes (NoDNs) may communicate with the IoT servers to share data or provide an interface to actuate control. Communications between the entities are enabled through the OneM2M protocol.

Example Challenges

Supervised machine learning offers powerful ways to analyze data gathered for a particular purpose. However, thus far, supervised learning systems have typically been focused on individual areas of interest due to the complexity of gathering and generating labeled data. For example, a movie streaming service may use data from a user's viewing habits and from viewing habits of other like users to learn and predict what movies or programs the user may enjoy. Similarly, housing price predictions may be made from past housing sales in the same area and from a demand metric computed based on the number of showings to prospective buyers.

The data in the two example use cases (e.g., movie streaming and home prices) may be obtained from the platforms each runs on. For the movie streaming service, account information may be gathered and compared with other users within the platform. Similarly, housing prices may be obtained from government databases, but the demand metric may need to be obtained from various realtors which may delay data collection. Nevertheless, the data may need to be pre-processed and transformed depending on the format of the input and based on the algorithmic requirements.

Using IoT systems, there are opportunities for greater automation, both in the collection of data, and into the organization of data into useful labeled data sets.

Figure 2:
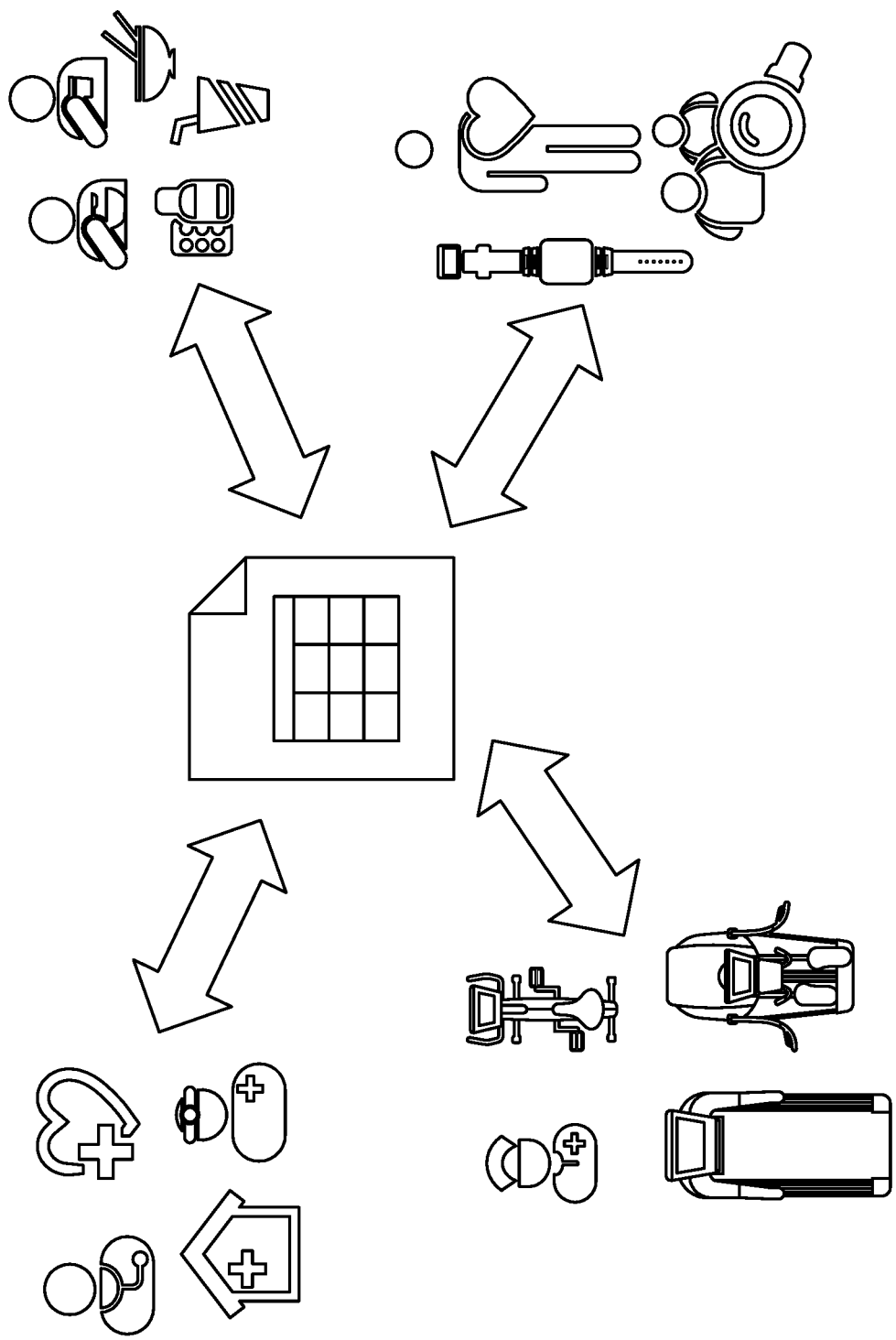
FIG. 2 illustrates an example cardiac rehab use case.

FIG. 2 shows art example cardiac rehab use case in which data from numerous sources are obtained to monitor a patient going through cardiac rehab. A patient has had a heart attack and had a stent inserted to reopen a blocked artery. From the body's perspective, the stent is considered a foreign object and hence, it may react to the stent by trying to cover up the stent. This reaction may result in a blockage of the artery which may cause another heart attack. The risk of blockage is greatest immediately after the stent procedure and decreases as time passes and the patient completes cardiac rehab and possibly makes life style changes.

During the recovery period, the patient may need to be closely monitored to ensure that complications do not arise. Information may be gathered from a cardiac rehab center which monitors the patient's vitals while the patient is exercising. The patient may have to be attentive to the food and drink that is consumed and take prescribed medications post-surgery. Wearable and home medical devices may provide vital readings during times outside a medical facility. Finally, visits to the doctor's office may provide additional information from the examination. The information gathered may be combined with a doctor's notes on a patient's condition, diagnosis, and prognosis at 30-day, 60-day, and 90-day intervals, for example, to evaluate how a patient's recovery is progressing. A longer-term study may then be made to combine data from various patients to identify critical metrics that may improve a patient's recovery during cardiac rehab.

Traditionally, health care studies have revolved around forming study groups with a limited sample size and having a research team monitor the progress of individuals in the group for a certain duration. This is both time consuming and expensive to carry out. If data are required from various data sources, this may take some time to gather, especially if the data sources are not controlled by the same entity. In the cardiac rehab use case, data may conic from a doctor's office, the cardiac rehab center, the patient, and wearables and home monitoring devices belonging to the patient. The collection and association of the various input data with each other may be prone to error if the collected data comes from different sources and occurs at different times. Once data are collected, annotations on expected outputs need to be made. However, these annotations may be made at a future time from when the input data were collected. Again, the expected output annotations need to be aligned with the collected inputs and may be prone to error. The combination of the collected inputs and the expected outputs are collectively known as labeled data. The inputs may conic from sensor readings, the medications the patient takes, the food and drink consumed, and the total time the patient exercises. The expected outputs, which are considered the labels, may be the doctor's diagnosis and whether health vitals exceed a certain threshold while a patient exercises.

The gathering and collection of labeled data may be tedious and time consuming, especially if the data comes from many different and varied sources. The desired input data may come from a source that includes other data that is not relevant to the learning algorithm, and therefore, the irrelevant data may need to be removed before the desired data is used. Furthermore, the desired data may not be in a form that is required by the supervised learning algorithm, and therefore may need further processing.

The strength of supervised learning is in its ability to support high dimensionality problems where a large number of inputs are present. It would be very difficult or near impossible to define such a function or to build a model where all the dimensions are accounted for. With this strength also comes the difficult component of generating labeled data, which traditionally has been difficult to generate. IoT technologies, on the other hand, offer a wealth of data and the ability to collect and process that data.

By combining the data gathering and processing capabilities of IoT technologies with the learning capability of supervised learning, even more advanced applications may be created. The diverse data sets that can be collected by IoT technologies may even enable cross domain supervised learning in which various input factors that may affect the learning outcomes are included in the labeled data set. In the cardiac rehab use case, diverse inputs such as the types and kinds of exercise, the food and drinks consumed, health metrics such as blood pressure and heart rate, and the prescription medications taken may all affect a patient's recovery, and thus may be learnt by supervised learning models to predict the best outcomes for future patients.

IoT Systems

IoT systems offer a wealth of data that may be used to automatically generate labeled data instances for supervised learning applications. IoT system components may process and transform the data collected from distributed IoT devices into applicable formats to fulfill the requirements of supervised learning algorithms. The systems may also be able to generate expected outputs using data available in the system and based on information provided by domain experts for the application. Finally, the collected inputs and generated expected outputs may be linked together as a labeled data instance and provided to a target node to be used in the training of supervised learning algorithms. Although the proposed functionality is described here as being applied to supervised learning, it will be appreciated that the techniques described herein may also be applied to other machine learning methods, such as semi-supervised learning and unsupervised learning.

Figure 3:
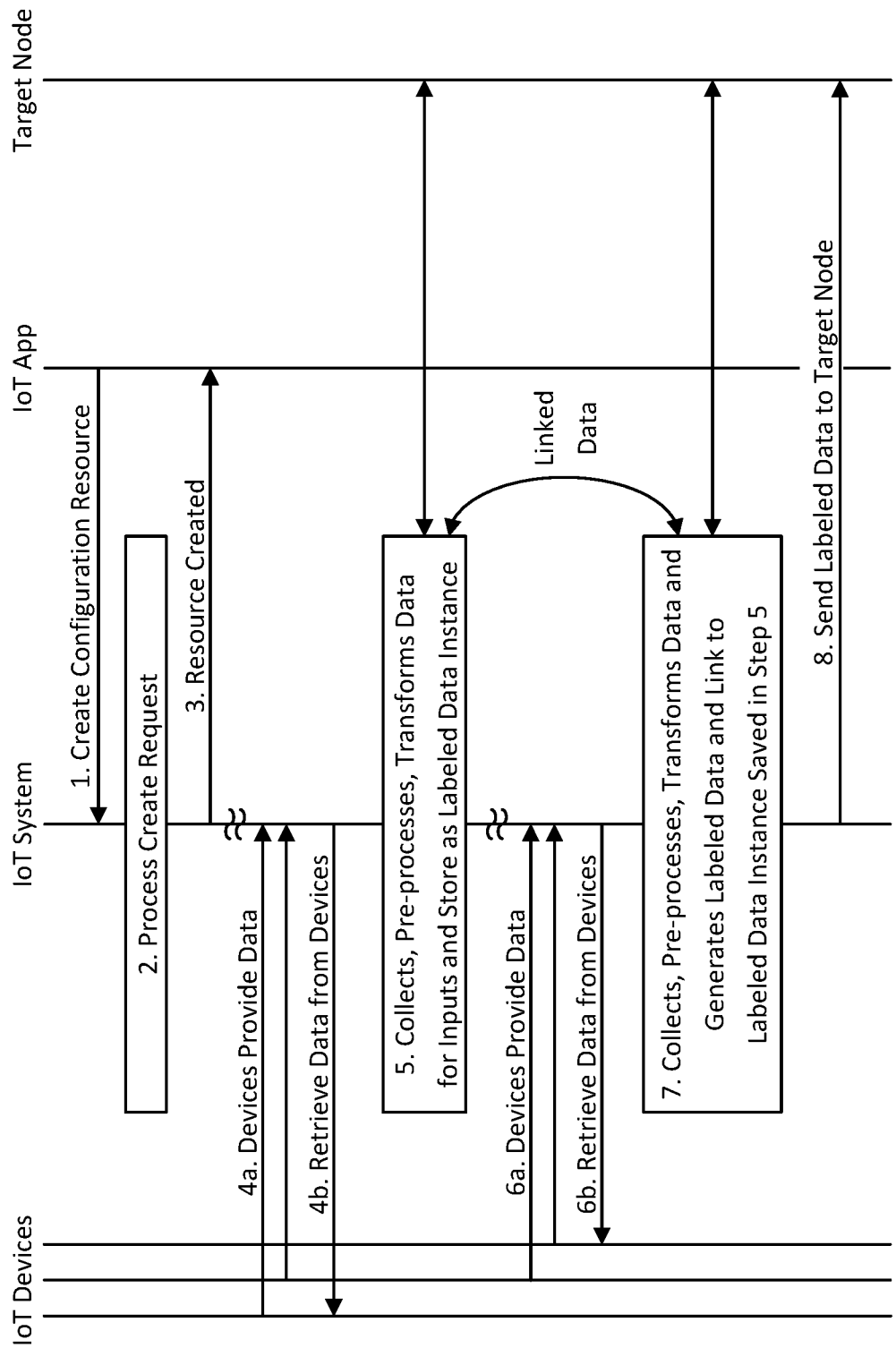
FIG. 3 is a call flow of an example IoT labeled data generation process.

FIG. 3 shows an overview of an example process of an IoT data labeling system supporting the automatic generation of labeled data instances. A user using an IoT App may first configure the IoT data labeling system with information on how to collect, process, generate, and clean labeled data instances. The user in this case offers domain knowledge of the data to be collected and processed. Note that the figure shows this configuration through the creation of a resource. It should be understood that this is only a representative mechanism, and this may be done by other mechanisms, such as through a web interface. The IoT data labeling system then monitors for data from IoT devices to collect, process, and store them as inputs in the labeled data instance, possibly at different times. In addition, the IoT data labeling system may monitor for data from IoT devices that become available after the time when the inputs were initially gathered, and use the later-collected data to generate expected outputs. The expected outputs are linked with the previously saved input data to form a labeled data instance. As necessary, the IoT data labeling system may communicate with a target node to enhance the processing and/or labeling of the data. Finally, the IoT data labeling system sends the completed labeled data instance to a target node for use in training, a supervised learning algorithm. Note the term "target node" refers to a network node where labeled data instances are sent and saved. A target node may also provide functions to assist in generating elements of the labeled data instance where necessary. Note also that the IoT data labeling system may consists of one or more IoT servers in communication with a multitude of IoT devices in a broader IoT system.

In Step 1 of FIG. 3, a user creates a resource on a server within the IoT system through the use of an IoT application. The resource provides configuration information the IoT server uses to create labeled data instances based on data obtained from the IoT system. In cases where historical data are available, the configuration may be specified to generate labeled data from the historical data.

In Step 2, the IoT server processes the request and creates the configuration resource. During this process, the IoT server may start a labeled data generation service to begin monitoring for input data based on the configuration data provided in step 1. In some cases, the labeled data generation service may need to make subscriptions to resources external to the IoT server in order to get updates to those resources. Alternatively, the labeled data generation service may be started at a later time to coincide with the time when data is supposed to be collected. For example, data collection may be started a week or a month later than when the resource was created in step 1. The labeled data generation service may also be triggered to start based on the occurrence of events or based on receiving notifications within the IoT system.

In Step 3, the IoT server returns an appropriate response to the creation request.

In Step 4, sometime after the labeled data generation service has started, a labeled data instance may be created within the IoT server to collect data for the required algorithm. Then the IoT server may start monitoring for inputs specified by the data configuration resource created in step 2. During this time, IoT devices may provide data to the IoT server as part of their normal operations (Step 4a). For cases where historical data are to be used as inputs, the IoT server may retrieve the historical data rather than monitor for data from the IoT devices (Step 4b). In yet other cases, the IoT server may need to proactively retrieve data from remote sources.

In Step 5, based on the configuration saved in the resource created in step 2, the IoT server identifies request messages from Step 4 that provide information about data provided by IoT devices. The requests are sent to the labeled data generation service to extract data for the required input and if necessary, to convert the data into a format suitable for use as inputs to a supervised machine learning algorithm. The converted data may also be transformed to fulfill the requirements of the learning algorithm and added to the labeled data instance. Note that steps 4 and 5 may occur at different times for different inputs. In addition, the IoT server may communicate with the target node to obtain certain preprocessing or data transformation functions that may not be available in the IoT server.

In Step 6, at a later time, IoT devices may provide data to the IoT server as part of their normal operations (Step 6a). The data in these cases are for use in generating the expected outputs required for the labeled data set. For cases where historical data are specified, the IoT server retrieves the historical data rather than monitor for requests from the IoT devices (Step 6b). For other cases, the IoT server may need to proactively retrieve data from remote sources.

In Step 7, the IoT server identifies requests that provide information required for the expected outputs or retrieves historical or remote data as needed. In either case, the labeled data generation service may generate the required expected outputs based on the data collected in this step and link the labels to the input data that have already been collected in step 5. The expected output data itself may be pre-processed and transformed as required and added to the labeled data instance to associate the expected outputs with the inputs. In some cases, the labeled data generation service may need to communicate with the target node to transform and/or label the data. The labeled data generation service may clean the labeled data set, e.g., if certain data characteristics are detected.

In Step 8, the IoT server sends the labeled data instance to the Target Node.

Figure 4:
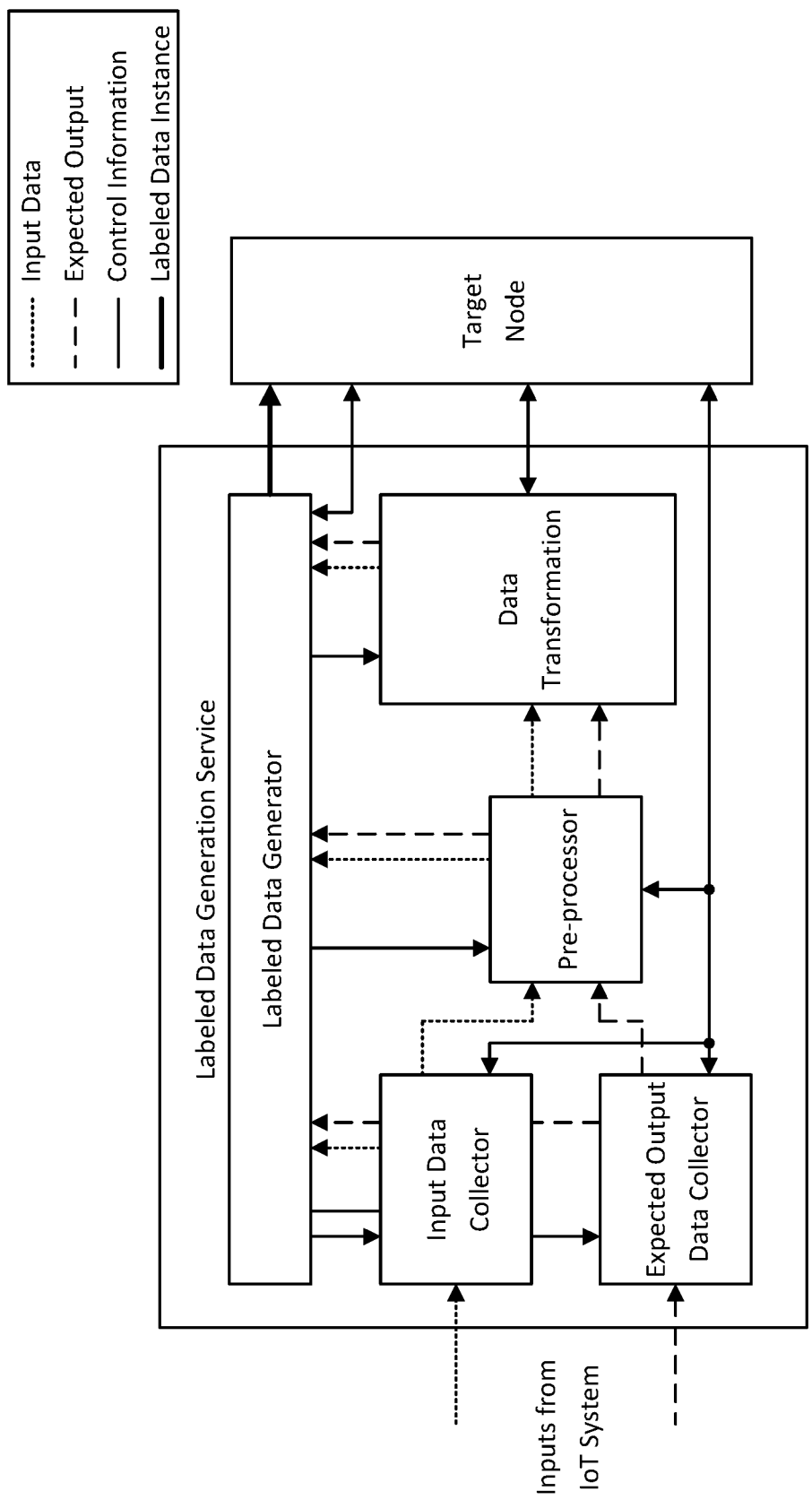
FIG. 4 is a block diagram of an example IoT labeled data generation service.

The labeled data generation service may consist of various components that communicate with each other in order to provide the capability to generate labeled data instances. FIG. 4 shows some of the components that may comprise the labeled data generation service. Note that the components shown are logical and each component may reside in separate network nodes within the IoT system. Alternatively, the labeled data generation service may be integrated as part of the functionalities of an IoT server, such as the one described by FIG. 1. For all the figures hereafter and as shown in FIG. 3, the labeled data generation service may exist within the IoT system in one or more IoT servers. The descriptions for each procedure described hereafter may allude to an IoT server, but it will be understood that components of the labeled data generation service shown in FIG. 4 may exist in multiple IoT servers within the distributed IoT system.

The data inputs to the labeled data generation service originate from the IoT system and go to one of two data collectors depending on whether the inputs are used for input data or expected output data in the labeled data instance. The data collectors monitor for data whenever they become available and extract the raw data from the representation provided by the IoT system.

Once the raw data have been extracted, they are passed to either the pre-processor or the data transformation function. The pre-processor may be used to convert the raw data value(s) from one unit of measurement to another unit of measurement, to convert from one data type to another data type, or to perform data aggregation of multiple input values or combinations thereof. The data transformation function may perform statistical functions that transform the data for use by a supervised learning algorithm. Such statistical functions may include normalization, scaling, standardization, binning, logarithmic, exponential, square root, and clamp transforms. These functions may be used to process the input data into a statistical form that fulfills the requirements of supervised learning algorithms. The data collector output may need to be pre-processed, statistically transformed, or a combination of the two. The required processing depends on the characteristic of the raw data source. In certain cases that the data collector outputs may already be in the form required by the supervised learning algorithm, the data may pass through the data transformation function directly without any processing.

The labeled data generation component takes the data transformation function outputs and links the inputs and expected outputs together into a labeled data instance. Over time, these labeled data instances will then collectively form the set of labeled data required to train the supervised learning algorithm and generate a machine learning model to predict new data. The raw data received from the IoT system may come at various times, and hence, the labeled data generation component needs to align the inputs and expected outputs appropriately to form the labeled data instance.

FIG. 4 also shows communications between components of the labeled data generation service, both internally and with the target node externally. These communications allow for the passing of control information among the entities in order for each to perform its indicated functions. In the case of the data collectors, information may be shared between the components to provide linking information between the inputs and expected outputs. This linking information is maintained as the individual data streams flow through the labeled data generation service and finally used by the labeled data generator. This linking information is important to preserve the input-expected output relationship required for the labeled data instance.

The control information shared between the target node and the various components of the labeled data generation service provides for any specialized processing that may be required by the supervised learning algorithm for which the labeled data generation service does not support. For example, if the input data source is from a database table with a certain schema, the labeled data generation service may contact the target node to parse the required data from the table entry and return only the interested value(s). Furthermore, the communications may also entail sending control and/or data annotations between the entities. An example involves the target node sending categorical information to be used in the labeled data instance.

Note that the target node shown in FIG. 3, FIG. 4, and in figures hereafter may represent one or more external nodes that provides the indicated function. For example, one target node may provide a pre-processing function while another target node may provide a data transformation function that the labeled data generation service may not support. Therefore, the target node references in the figures may apply to different external nodes but they are grouped together collectively and represented as the target node in the figures.

Labeled Data Configuration Resource

To provide the data needed by supervised learning algorithms, IoT data labeling systems may be configured via a data configuration resource to monitor for inputs, to generate expected outputs, and to link them together into labeled data instances that form the labeled data set. This data configuration resource may be created by a user or domain expert who may be familiar with the requirements of the supervised learning problem. The resource may specify a list of inputs to be captured, the expected outputs to be generated, the pre-processing that may need to be performed on the data, any potential data transformation requirements, and the linking of the data together as a labeled data instance before sending to a target node. In some cases, the labeled data instances may be cleaned before they are sent to the target node. Rules for data cleaning may be provided in the data configuration resource. Table 1 of the Appendix shows some example parameters that may be present in the data configuration resource.

Once the data configuration resource is created, the IoT system may immediately start the labeled data generation service to begin collecting data for the labeled data set. Alternatively, the IoT system may wait to start the labeled data generation service until a later time when the input data will become available. The data configuration resource may provide this information to the IoT system. The labeled data generation service may also be started by the occurrence of certain event(s) within the IoT system, by receiving a notification to start, or by a scheduled start at certain times in a periodic manner as specified by the activate parameter.

When the user or domain expert creates the data configuration resource, configuration information may be provided on how to process the incoming data. As part of the configuration, the user or domain expert may direct the input data collector to forward input data to a target node. Once the target node receives the data, it may extract only the required data needed for the labeled data instance and return those data back to the labeled data generation service. The target node may even pre-process and transform the data if the labeled data generation service is not able to, e.g., it does not have the corresponding functions to perform such tasks. Conversely, if the labeled data generation service has the capability to be updated with new pre-processing and/or data transformation functions, then the user or domain expert may request these updates be performed prior to creating the data configuration resource to avoid requiring communications between the labeled data generation service and the target node.

Figure 5:
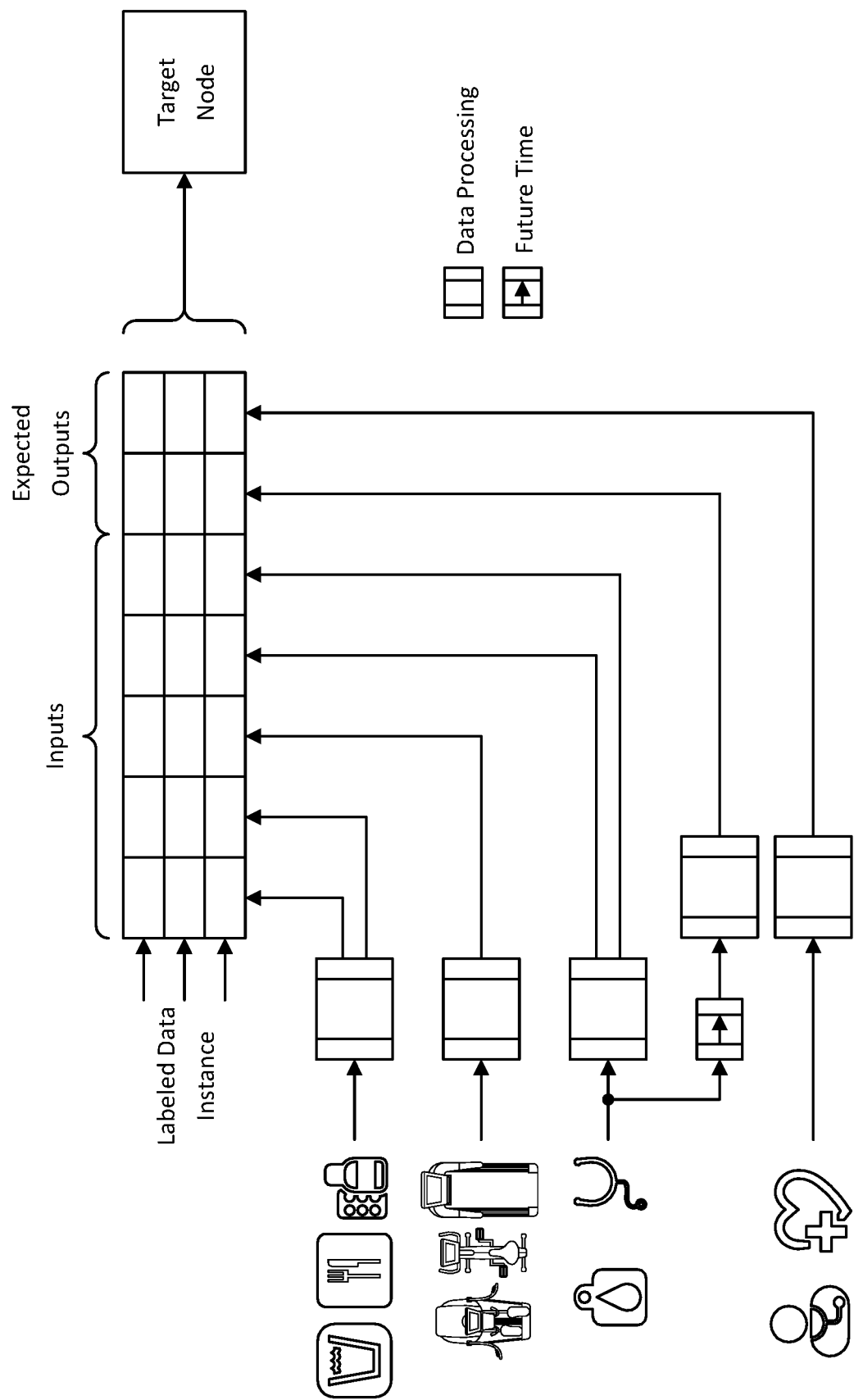
FIG. 5 illustrates an example labeled data instance.

After operation commences, the labeled data generation service may begin to generate labeled data instances as shown in the example of FIG. 5. Each labeled data instance consists of two components: one for collected inputs and one for expected outputs. If the data is captured in real time, then the labeled data generation service may monitor for each of the inputs listed in the data configuration resource. These data inputs may go through the pre-processor and data transformation functions before being saved into the labeled data instance.

Similarly, the labeled data generation service may also collect raw data from the IoT system for the expected outputs. Some of the expected outputs may originate from the same input sources that were previously collected but obtained at a future time. These expected outputs may be generated by comparing the raw data from the two data in time and provide some indication showing a desirable or not desirable output. Other expected outputs may be based on different IoT resources that may or may not be directly related to one of the inputs. The important element is that the expected output is obtained at some future time after collecting the inputs to show the possible effects the inputs have on the function being learned.

After the labeled data set has been generated, the labeled data generation service may need to perform data cleaning, e.g., if rules for cleaning are provided in the configuration resource. Such rules may direct the service to remove duplicate labeled data instances, verify numerical data are within range of the indicated input, ensure that mandatory data are present in the labeled data instance, and detect if there are conflicting labeled data instances. If a rule is present for the labeled data generation service to remove duplicate labeled data instances, any duplicate labeled data instance may be removed from the labeled data set before they are sent to the target node. For numerical data range verification, the cleaning rule may specify the range explicitly or the rule may include a semantic descriptor or a URI whereupon the labeled data generation service uses to retrieve the range from. Where a rule exists listing mandatory data, the labeled data generation service may check that the indicated data is present in all the labeled data instances. Finally, a rule may direct the labeled data generation service to detect for conflicting labeled data instances, e.g., when the inputs for two or more data instances are the same but one or more labels are different. Upon completion of the cleaning procedure, the labeled data generation service may send a list of labeled data instance identifiers that were "cleaned" from the labeled data set to the target node along with the other data instances in the labeled data set.

Labeled Data Generator

Once the data configuration resource is created, the labeled data generation service may immediately start operation, or it may be started at some future time as determined by the activate parameter. Once the service is started, the labeled data generator component may create a labeled data instance and assign an associated identifier and time stamp to begin the generation process. FIG. 6 shows an example of a labeled data instance with two inputs, each consisting of an input data parameter (inData1 and inData2) and a time parameter (Time1 and Time2), and one expected output, consisting of an output data parameter (outData1) and a time parameter (Time3), as well as the identifier (ID) and time stamp (Time) that the labeled data generation service may maintain internally. The actual data from a labeled data instance that is sent to a target node may have all the time references removed and contain only the data instance ID and all data associated with the inputs and expected outputs. In some cases, the data instance ID may be removed as well if it is not desired as indicated by the labeledDataOutput parameter. This parameter provides the user or domain expert the ability to configure the format of the labeled data instances to suit the needs of the learning algorithm.

The data instance ID provides information about the labeled data instance and the time it was created. This time may be used in conjunction with either the inputTimeRequirement or the outputTimeRequirement parameter to qualify data from the IoT system as inputs or expected outputs to be saved into the labeled data instance. The ID is used to associate data saved into the labeled data instance and shared among the different components within the labeled data generation service. The inputs and expected outputs of the labeled data instance are the elements that contain the actual data required by the supervised learning algorithm. These elements contain both the data (e.g. shown as inData1 and outData1 in FIG. 6) and the associated time stamp of when each item of data was collected. The associated time stamp may be used as a qualifier to ensure that the data meets either the inputTimeRequirement or the outputTimeRequirement parameter and may be removed prior to sending the target node the actual labeled data instance.

Figure 7:
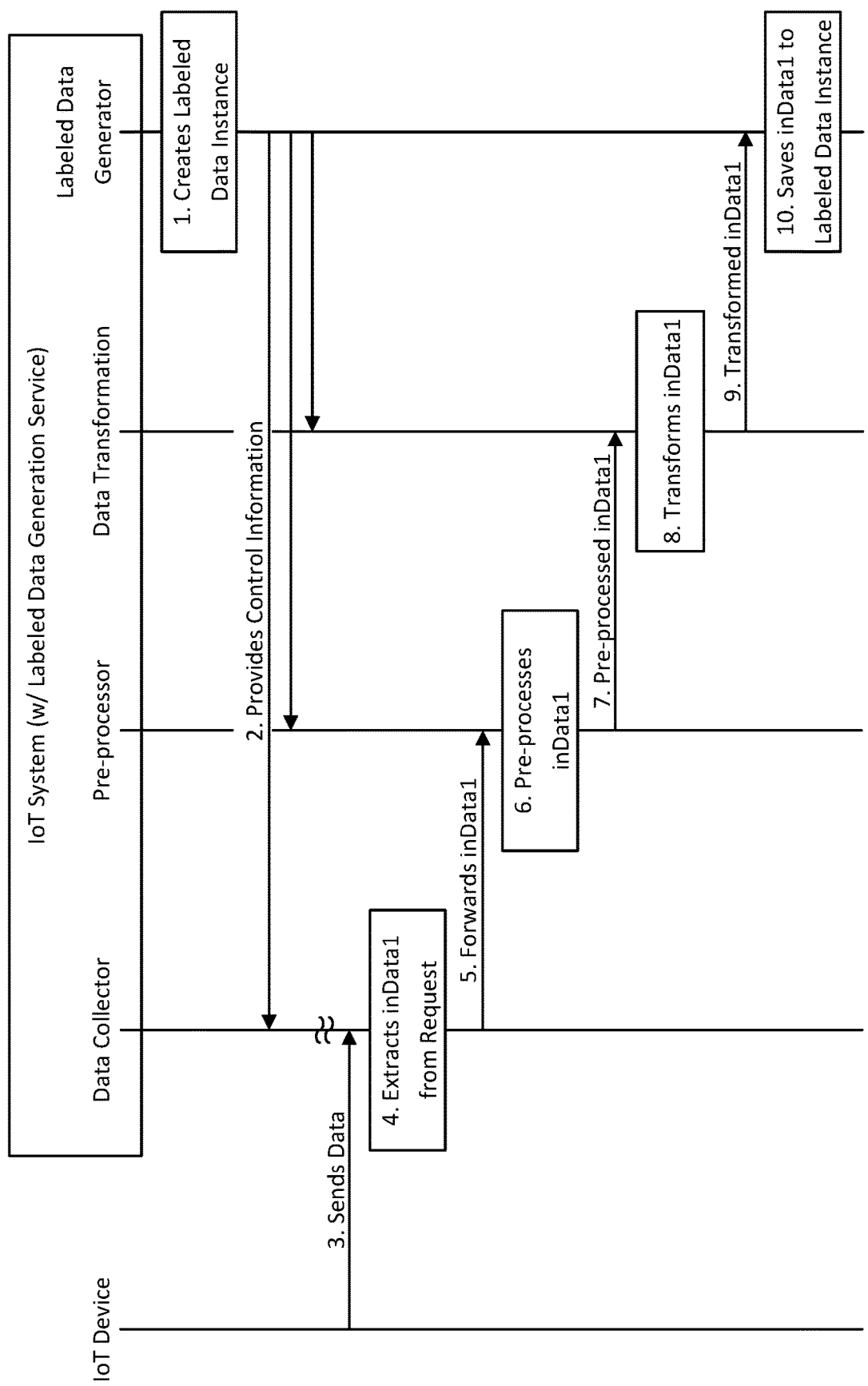
FIG. 7 is a call flow of a first example process for labeled data generation.

After the labeled data instance is created, control information is then provided to each of the components within the labeled data generation service. This control information may include parameters from Table 1 of the Appendix and may direct each component on how to process the incoming data received by the data collectors. The data may then be pre-processed and/or transformed before being forwarded to the labeled data generator, which may maintain the labeled data instance. FIG. 7 shows an example process of collecting data inputs for the labeled data instance through the labeled data generation service. Note that the individual components of the labeled data generation service are shown collectively within the IoT system in FIG. 7. These components may exist in separate IoT servers within the IoT system and communicate among each other, or they may collectively be part of the same IoT server and communications occur among distributed IoT servers. For example, data collection from different IoT devices may occur throughout the IoT system and among many different IoT servers in a distributed manner.

In Step 1 of FIG. 7, when the labeled data generation service is started, the labeled data generator component may create a labeled data instance and assign an identifier and a time stamp for the labeled data instance.

In Step 2, the labeled data generator may then provide control information to each of the other components to instruct how the data is to be processed. The control information may include the labeled data instance ID, identifier and/or URIs of data to collect, pre-processing and transformation functions to use, timing requirements, where to forward results, and a continuous or discrete processing indicator. The data collectors may start to monitor for data from IoT devices or other IoT servers at this time.

In Step 3, after some time, an IoT device may send data to an IoT server as part of their normal operations. Note that as an alternative, data may be provided by some database or another IoT service that provides historical data, or the labeled data generation service may proactively retrieve data from remote sources such as from other IoT servers.

In Step 4, using information from the inputDataExtraction parameter, the data collector extracts data from the request message and associates the data with the data instance ID. If an inputTimeRequirement parameter was specified, the data collector may qualify the data against the specified timing requirements to ensure it is the correct data to collect. In addition, the data collector may identify which input element the data should be associated with. In the example shown in FIG. 7, the data is associated with the inData1 element.

In Step 5, the data may then be forwarded to the pre-processor according to the inputSource parameter provided. This parameter provides routing information within the labeled data generation service.

In Step 6, the pre-processor applies the function specified by the inputPreProcessing parameter to the incoming data. If a data aggregation function is specified, the pre-processor may store the data internally and wait for more data to aggregate.

In Step 7, once the data has been aggregated or if the data is a single, discrete value, the pre-processor may forward the pre-processed data to the data transformation component according to the inputSource parameter.

In Step 8, the data transformation component may apply a transformation function upon the data as specified by the inputDataTransform parameter.

In Step 9, the transformed data may then be forwarded to the labeled data generator component.

In Step 10, the data is saved in the inData1 element of the labeled data instance with an appropriate time stamp.

Figure 8:
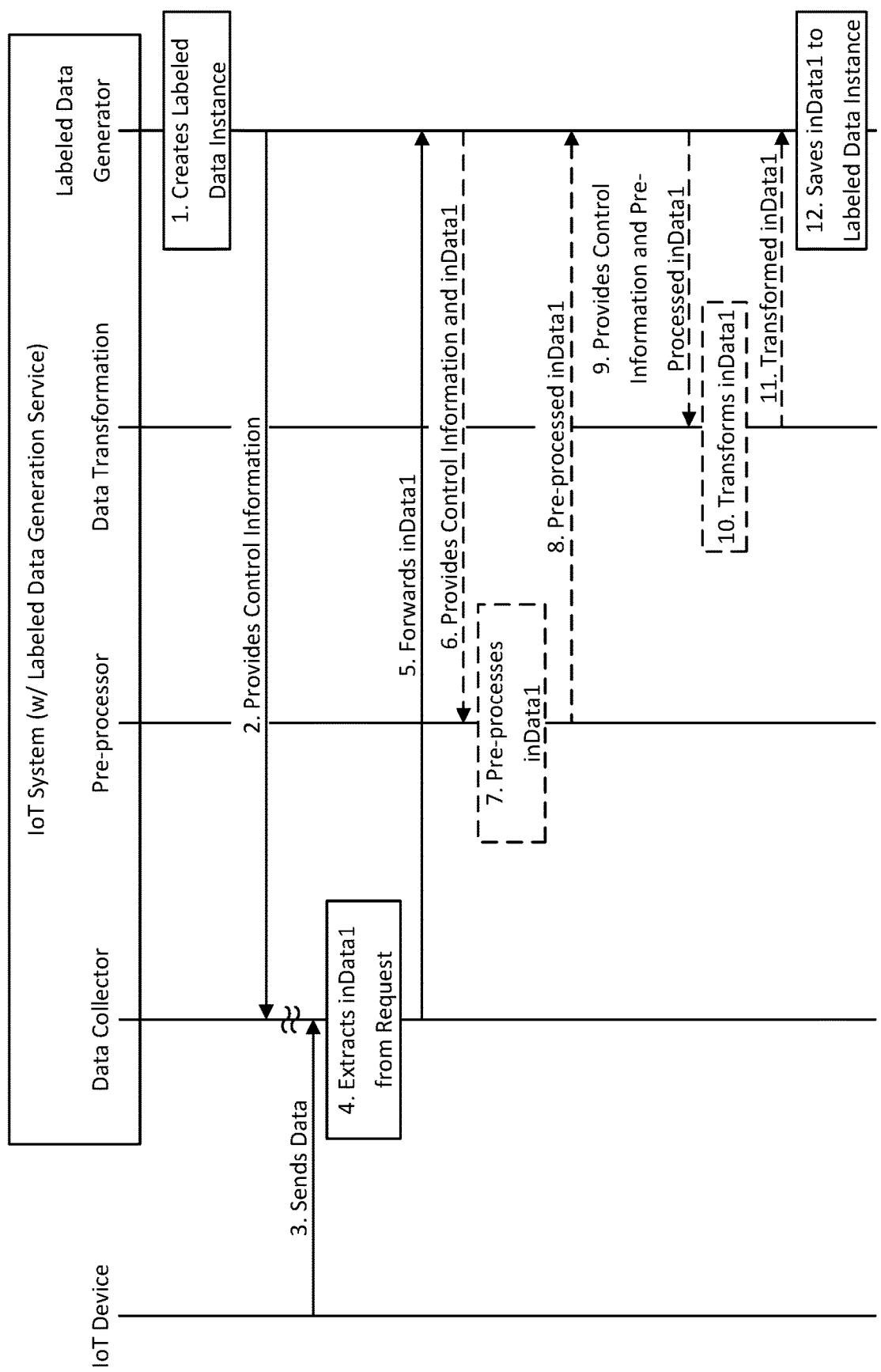
FIG. 8 is a call flow of a second example process for labeled data generation.

FIG. 7 shows one approach wherein the labeled data generator component may communicate control information to the other components of the service. This approach works best for cases where data flow through the service is straightforward and occurs in a sequence. For other cases, the labeled data generator may provide control information when processing is required as shown in FIG. 8. In this approach, the control information is sent and in some cases with the data to be processed. The labeled data generator receives data from each component and makes decisions on how the data is to be further processed. This approach may be required for cases in which further processing is not required, e.g. if the data is already in the form required by the supervised learning algorithm, or when the components of the labeled data generation service are dispersed in separate servers within the IoT system. An example where further processing is not required may be when the data source comes from historical data which is already in the required form.

Steps 1-4 of FIG. 8 are similar to Steps 1-4 of FIG. 7. The only difference is that for Step 2, the labeled data generator may only send control information to the data collector component.

In Step 5, based on the control information received, the data collector may forward the extracted data to the labeled data generator component. If the data is already in the form that is required by the supervised learning algorithm, the labeled data generator may move to Step 12 and save the data in the labeled data instance. This determination may be obtained from the data configuration resource where the inputPreProcessing and inputDataTransform parameters are set to null to indicate no processing is required.

The dashed lines in FIG. 8 indicate that Steps 6, 7, and 8 conditionally apply. For example, Step 6 is only applicable is the data requires pre-processing. In Step 6, if the data requires pre-processing, the labeled data generator may send the pre-processor component control information as well as the data to be processed.

In Step 7, the pre-processor processes the data according to the control information.

In Step 8, the pre-processor returns the processed data to the labeled data generator. If the data is in the required form, the labeled data generator may move to Step 12 to save the data in the labeled data instance.

In Step 9, if the data requires data transformation, the labeled data generator may send the data transformation component control information as well as the data that needs transformation.

In Step 10, the data transformation component transforms the data according to the control information.

In Step 11, the data transformation component returns the transformed data to the labeled data generator.

In Step 12, the labeled data generator saves the data in the labeled data instance.

Figure 9:
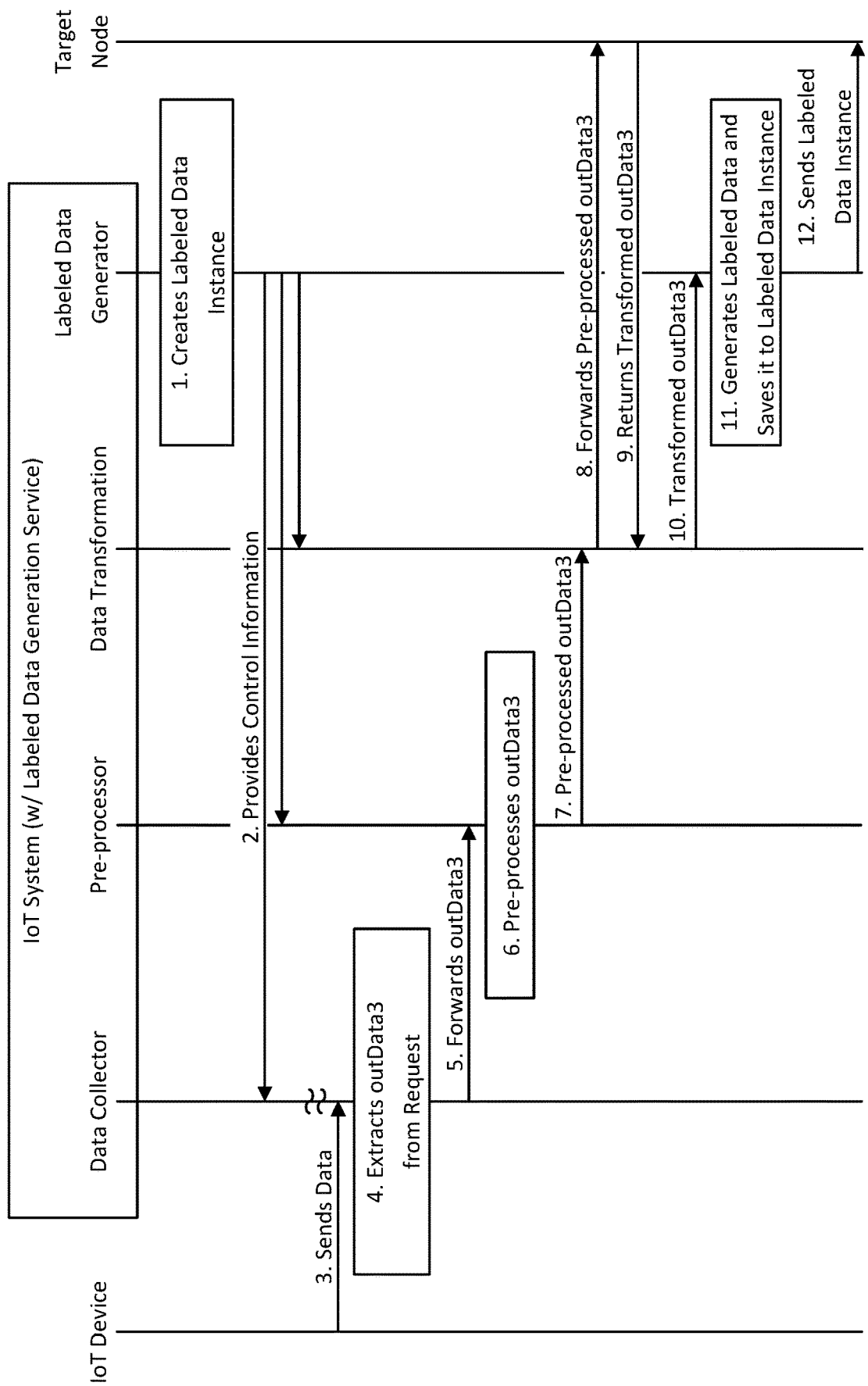
FIG. 9 is a call flow of a third example process for labeled data generation.

FIG. 7 and FIG. 8 show examples where the collected data are associated with inputs in the labeled data instance. For cases involving expected outputs, FIG. 9 shows an example where the data transformation component may need to communicate with a target node to properly transform the data. This case may be triggered when the data transformation function is proprietary or is not available in the labeled data generation service.

Steps 1-7 of FIG. 9 are similar to Steps 1 to 7 of FIG. 7. The only difference is that the data being processed in this case is associated with an expected output of the labeled data instance rather than an input.

In Step 8, the data transformation component is directed by the control information to forward the pre-processed (e.g., outData 3) data to the target node. The control information in this case may be the labeledDataSource parameter.

In Step 9, the target node returns the transformed data (e.g., outData 3) to the data transformation component.

In Step 10, the transformed data (e.g., outData 3) is forwarded to the labeled data generator.

In Step 11, the labeled data generator generates the labeled data according to the labeledDataExpression parameter and saves it to the labeled data instance.

In Step 12, if cleaning rules are provided, the labeled data generator may further process the labeled data set and apply the appropriate cleaning rules such as removing duplicate labeled data instances or checking for conflicting data instances. Note that the labeled data generator may have to wait until sufficient labeled data instances are created before performing this processing. If no cleaning rules are provided, the labeled data instance may be forwarded to a target node with only data specified by the labeledDataOutput parameter. Using FIG. 6 as an example, the identifier and time information of the labeled data instance may be removed and only the pertinent data (e.g., inData1, inData2, and outData1) are sent to the target node.

Figure 10:
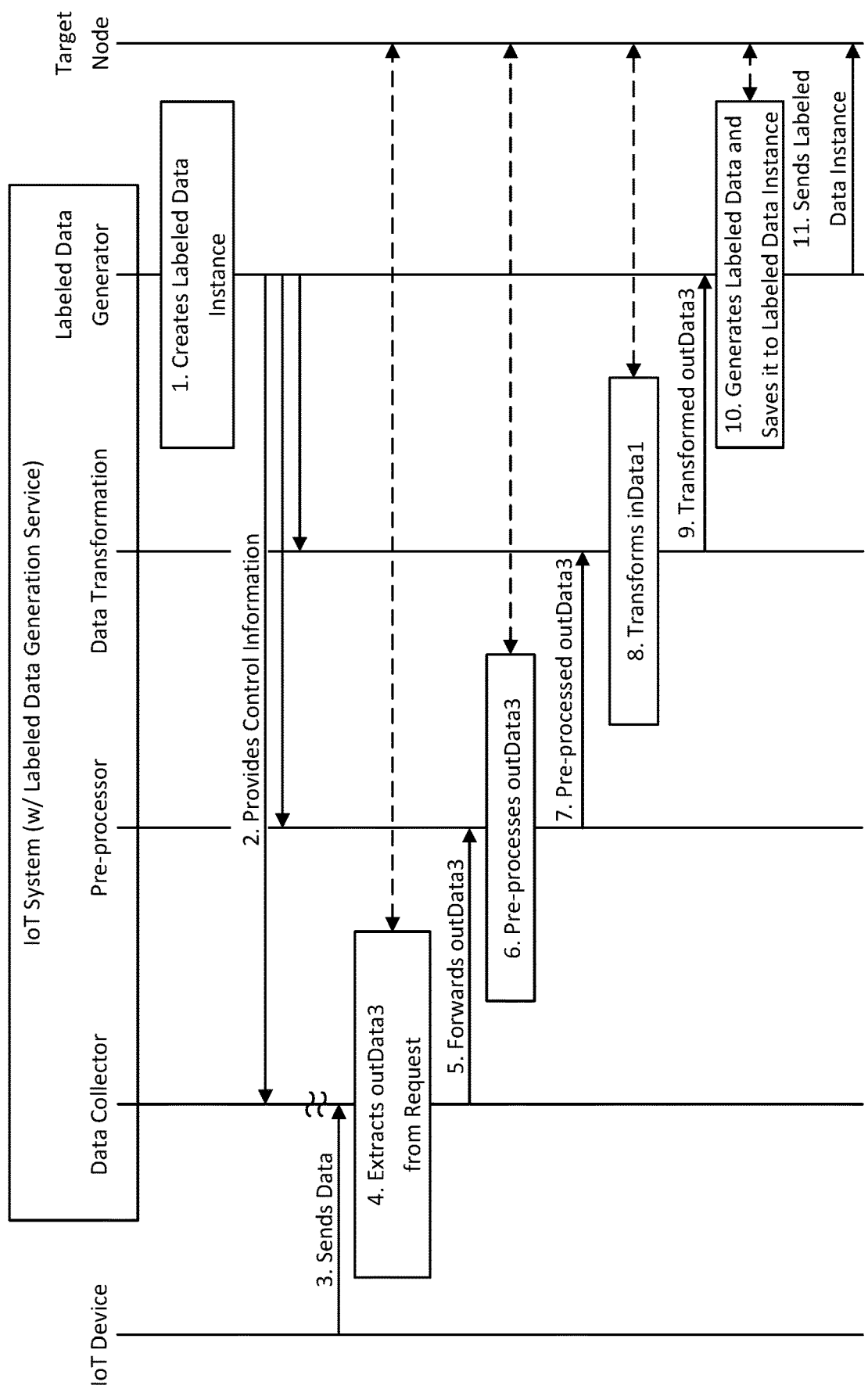
FIG. 10 is a call flow of an example process for labeled data generation service communications with target node.

As shown in FIG. 9, there may be cases in which components within the labeled data generation service may need to communicate to a target node for processing that it may not support. An example is when fog or edge nodes are utilized to perform data collection and basic pre-processing and data transformation functions for a labeled data generator and target node in the cloud. FIG. 10 shows a generalized call flow in which each component may communicate to a target node individually. The dashed lines in Steps 4, 6, 8, and 10 show this communication. Each component may be made aware of the need to communicate to a target node based on the control information such as the inputSource and labeledDataSource parameters provided by the labeled data generator.

Steps 1 to 3 of FIG. 10 are similar to Steps 1 to 3 of FIG. 7.

In Step 4, in certain cases, the data collector may communicate to a target node to extract the necessary data from the source. An example may be that a conversion function required is not supported by the data collector, or if the data collector is retrieving data from a database which contains more data than is needed and requires the assistance of the target node to properly extract the necessary data.

In Step 5, the extracted data (e.g., outData 3) is forwarded to the pre-processor.

In Step 6, the pre-processor may need to communicate to a target node to have the data processed by a function it does not support. An example may be a user-defined data aggregation function in which the pre-processor gathers all the inputs together and then forwards them to the turret node for processing.

In Step 7, the pre-processed data (e.g., outData 3) is then forwarded to data transformation component.

In Step 8, certain data transformation functions may require execution in a target node, and hence, the data transformation component forwards the pre-processed data to the target node for processing. These functions may be available in a library on the target node that is not available in the data transformation function.

In Step 9, the transformed data (e.g., outData 3) is forwarded to the labeled data generator.

In Step 10, there may be cases in which the labeled data generator may require the assistance of a target node to generate the labeled data. An example may be that the target node may apply a lookup table (LUT) where labels are applied for a classification problem. The labeled data generator then links the inputs and expected outputs together to form a labeled data instance.

In Step 11, if cleaning rules are provided, the labeled data generator may further process the labeled data set and apply the appropriate cleaning rules such as removing duplicate labeled data instances or checking for conflicting data instances. Note that the labeled data generator may have to wait until sufficient labeled data instances are created before performing this processing. If no cleaning rules are provided, the labeled data instance is sent to the target node with only data specified by the labeledDataOutput parameter.

The generation of labeled data may be made in one of several approaches and is defined by the labeledDataExpression parameter of the data configuration resource. One approach may be to compare a change in a metric that is maintained within the IoT system. In the cardiac rehab use case, the metric may be the blood pressure readings at the beginning and the end of a test period. The change in blood pressure readings may be used to generate the labeled data with a positive change labeled as desirable and a negative change labeled as undesirable. Another approach is to identify a resource that may provide an indication of the effect from the inputs of the supervised learning problem. For example, the inputs to the cardiac rehab use case may comprise of exercises, healthy eating, and taking medications to help the heart recover. A resource may be used where the patient indicates that he/she may walk for an extended time without shortness of breath. This resource may note the number of minutes that the patient walked, and that value may be used for the labeled data in a regression problem. A third approach may be to detect whether an action occurred within the IoT system and whether that action is desirable or not. For example, during the recovery period, the patient may need to visit an emergency room or schedule an unexpected appointment with the doctor due to chest pains and the occurrence of such an event may be labeled as undesirable.

Data Collectors

When the labeled data generation service is started, the data collectors may begin to monitor for inputs required for the labeled data instance as specified by the activate parameter. The data collectors may operate in real time or may be configured to interface to data sources that provide historical data, such as data in a database or provided by another service within the IoT server. The interface to historical data may require further assistance from the target node if the data collectors are not provisioned with the structure of the data, e.g. when tabular data from a database is passed to the target node for parsing, and the desired inputs are returned to the data collector. The target node may be operated by the user, and hence, has knowledge of the data format of the table.

For cases in which the data collectors operate in real time, the component may monitor for resources as directed by the control information. These inputs may be provided at different times within the IoT system and the data collectors may need to ensure the inputs are aligned with each other. Thus, the input data collector may need to associate the inputs to the labeled data instance identifier provided in the control information. In addition, time stamp information may also be provided to support the checking of the timing relationship between the inputs and expected outputs. The input data collector may include this identifier and the time stamp to the expected output data collector to achieve this association. The identifier and time stamp may be maintained throughout the process flow within the labeled data generation service to preserve this input-expected output relationship. This information may only be used within the labeled data generation service for maintaining input-expected output association and may be removed from the labeled data instance before sending it to the target node.

Another function of the data collectors is to extract only the desired data from the resource representation provided by the IoT servers or devices. The IoT resource representation may have meta-data and/or protocol specific data that may not be required by the supervised learning algorithm. Thus, these data may be removed and only the data of interest are saved to the labeled data instance. The data collectors, however, may use this information to determine whether a unit conversion is required to be performed. This determination may be provided to the pre-processor to perform the actual conversion or to the labeled data generator to include in the control information provided to the pre-processor.

In certain cases, the data collector may need to retrieve data from resources external to an IoT server if the resources are not hosted locally. For these cases, the data collector may interface to a remote IoT server to perform a retrieval of the data or it may perform the operation independent of the IoT server. If performing independently, the data collector may need to send a retrieve request to the external entity or request an observation or subscription of the resource to be notified of the value of the resource. The subscription or observation may be time limited to ensure data is received within a specified time, which may be linked to the inputTimeRequirement parameter.

Figure 11:
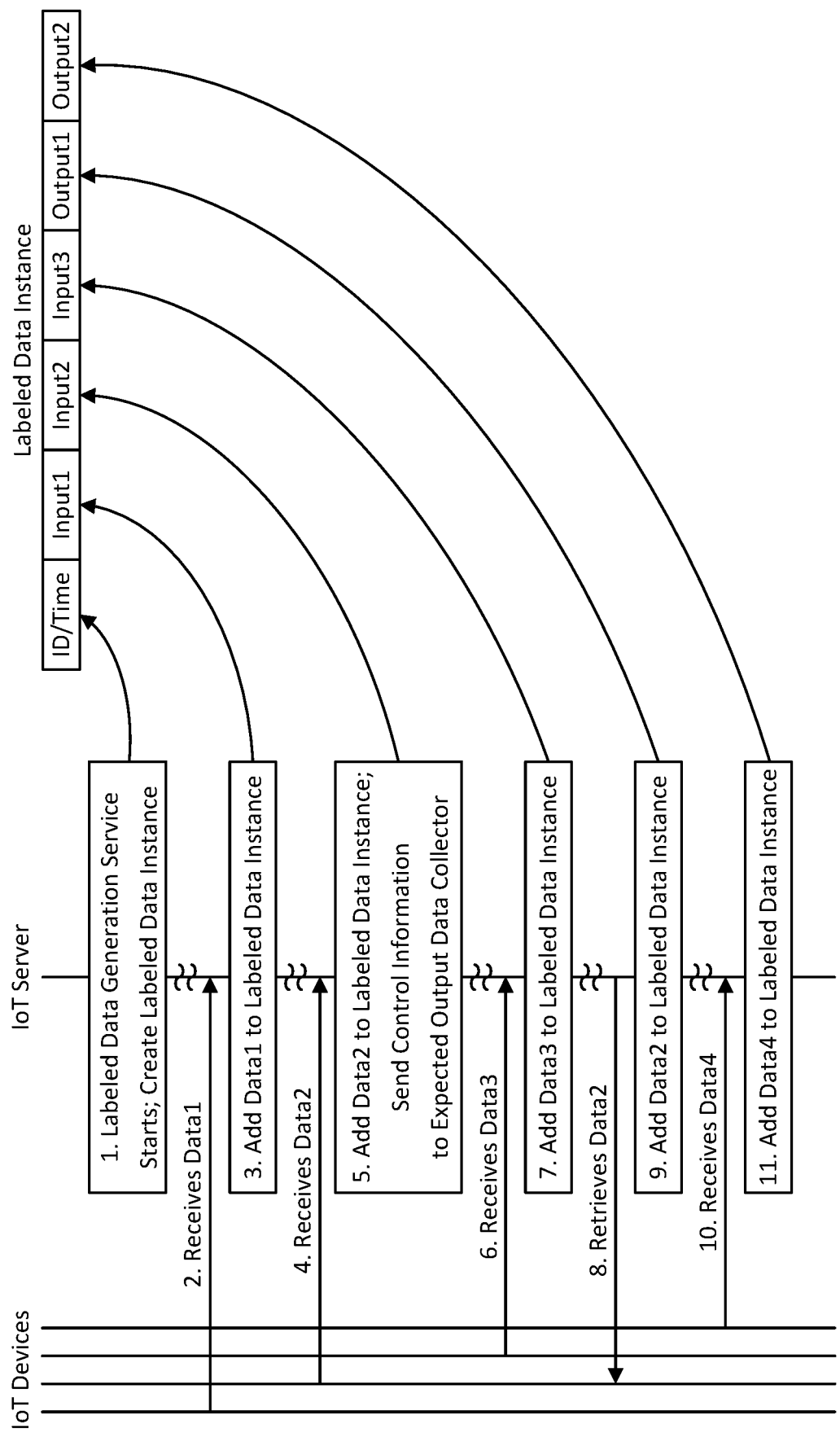
FIG. 11 is a process flow of an example process for data collection.

Depending on the number of data sources required to generate the labeled data instance, the data collector may need to operate over some duration of time. FIG. 11 illustrates an example process flow of the data collection processing where five data elements are required to be collected and how each item of data is separated in time. The figure shows the combined operations of both the input and expected output data collectors operating within an IoT server. The figure also shows that data2 is utilized for both input and expected output data elements of the labeled data instance. The first time data2 is available, the data is saved as an input of the labeled data instance, and the second time data2 is available, the data is saved as an expected output of the labeled data instance. Note that FIG. 11 shows only a single IoT server collecting data for the labeled data instance for simplicity, but multiple IoT servers may be involved in collecting the data for the labeled data instance.

In Step 1 of FIG. 11, when the labeled data generation service is started, a labeled data instance may be created by the labeled data generator component. The labeled data instance may contain an identifier to associate the input-expected output relationship and also a time stamp of when the labeled data instance was created. The time stamp may be used to qualify adding data to the labeled data instance based on the inputTimeRequirement and outputTimeRequirement parameters. The labeled data generator component may have knowledge of the data configuration resource parameters and may communicate control information to the other components of the labeled data generation service. In addition, it is assumed that the labeled data generation service has access to all required data. This may be realized by subscribing to get notifications for data resources that are hosted on remote IoT servers.

In Step 2, the IoT server receives data1 from an IoT device.

In Step 3, the input data collector may associate this input to a labeled data instance identifier based on control information provided in step 1. Based on the inputDataExtraction parameter for this input, the input data collector may extract the necessary data element to add to the labeled data instance. The input data collector may also add a time stamp of when this input was received and may save both to the input1 element of the labeled data instance. The input data collector may qualify the time of data1 if a timing requirement was provided in the inputTimeRequirement parameter for input1.

In Step 4, sometime later, the IoT server receives data2 from an IoT device.

In Step 5, similar to Step 3, the input data collector may extract the data and save the information along with a time stamp to the input2 element of the labeled data instance. The input data collector may qualify the time of data2 if a timing requirement was provided in the inputTimeRequirement parameter for input2. Since data2 is also used to generate one of the expected outputs, the labeled data generator component may provide control information to the expected output data collector to start monitoring for data2.

In Step 6, sometime later, the IoT server receives data3 from an IoT device.

In Step 7, similar to Step 3, the input data collector extracts the data and saves the information along with a time stamp to the input3 element of the labeled data instance. The input data collector may qualify the time of data3 if a timing requirement was provided in the inputTimeRequirement parameter for input3.

In Step 8, sometime later, the IoT server may retrieve data2 from an IoT device or another IoT server where data is hosted. The expected output data collector may use the control information provided in Step 5 and the outputTimeRequirement parameter to explicitly retrieve data2. In this case, the outputTimeRequirement parameter may require that before output1 can be generated, an event must occur first in which the data for input2 is captured. This requirement provides an implicit link between input2 and output1 that may be very important to the learning algorithm. For example, in the cardiac rehab use case, it is very important that a patient's heart rate be compared before and after exercise. This relationship may infer the degree of effort the patient is exerting during rehab e.g., too much exertion is not good for the patient's heart while too little exertion is not benefiting the patient's recovery. The expected output data collector may determine that in order to meet the outputTimeRequirement parameter, an explicit retrieval is required instead of waiting for data2 to arrive.

In Step 9, the expected output data collector may process the response due to the control information provided in Step 5. The expected output data collector may use the information in the outputDataExtraction parameter to extract the data from the response and save the data and the associated time stamp to the output1 data element of the labeled data instance.

In Step 10, sometime later, the IoT server receives data4 from an IoT device.

In Step 11, similar to Step 9, the expected output data collector may extract the data from data4 and save the value with the associated time stamp to the output2 element of the labeled data instance. If necessary, the expected output data collector may also qualify data4 against the time value specified in the outputTimeRequirement parameter. At this point, the data collection is complete for one labeled data instance. If the data configuration resource had specified continuous operations, the data collectors would resume data collection for the next labeled data instance.

The example data collection flow shown in FIG. 11 shows a use of the outputTimeRequirement parameter and the linking of information it may provide to the labeled data generation service. With machine learning, there usually is a cause and effect relationship embedded within the application. This relationship provides the link between inputs and expected outputs and may be one aspect of the function to be learnt. The outputTimeRequirement parameter provides the mechanism to indirectly obtain this information as the data is being generated.

Pre-Processor

After the required data has been extracted from a request, the data may be forwarded to the pre-processor. The pre-processor may then convert the data from one unit of measurement to another unit of measurement as indicated by the control information and/or provided by the data collector based on available meta-data. In addition, there may be a unit conversion within the same unit of measurement, e.g. from kilograms to grams. Finally, a data aggregation function may be utilized if there are multiple data inputs that may need to be reduced to a single value.

For the data aggregation functions, the pre-processor may need to maintain a count of the number of data inputs it receives from the data collector. This count value may be required by data aggregation functions such as average and count for cases in which a time requirement may be configured. The availability of this function may provide flexibility in allowing the generation of labeled data instances from various data sources, some of which may have different numbers of data samples relative to other data samples. Note that the control information may also provide a count which the pre-processor uses to ensure the correct amount of data is aggregated.

The pre-processor may also support compound data aggregation functions in which one function supports a first level of aggregation and another function supports a second level of aggregation. These compound data aggregation functions may be nested together within the inputPreProcessing parameter and may be represented as max [avg(x)]. For example, a maximum value may be obtained from a daily average of a measurement such as blood sugar levels for the duration of a week or a month.

There may be times where the required pre-processing function may not exist within the pre-processor component. For these cases, the pre-processor may need to communicate to an external node to pre-process the data. The external node may be any node that provides the necessary pre-processing function, or it may also be the target node as well. This information may be provided in the control information provided to the pre-processor along with the URI of an external node or even the target node. This communication is shown by Step 6 of FIG. 10. When multiple data need to be processed, the pre-processor may wait to communicate to the external or target node until all data are available to be sent together, such as in aggregation cases.

Data Transformation

The data transformation component may further process the data to ensure it is in a form that the supervised learning algorithm requires. The processing functions here may be statistical functions such as normalization, standard deviation, binning, logarithm, etc. compared to the data aggregation functions found in the pre-processor. Some supervised learning algorithms may have strict requirements on the format of the data and the algorithm may not work properly if the data is not transformed appropriately. Therefore, the data transformation component performs a critical function in the labeled data generation process.

Similar to the pre-processor, the data transformation component may also be able to communicate to an external node for cases where the data transformation function may not be available. After receiving the control information from the labeled data generator, the data transformation component may make the determination that it requires assistance from an external node and may forward any pre-processed data it receives. The data returned from the external node may then be associated with the data instance ID and a time stamp may be added to the data sent to the labeled data generator.

Data Cleaning

Data cleaning may be performed, for example, if cleaning rules are provided in the data configuration resource. Data cleaning may be performed when the entire labeled data set has been created. The cleaning rules may specify that all duplicate labeled data instances be removed from the set before it is sent to the target node. This process cleans the data that may be necessary or required by the supervised learning algorithm. Other cleaning rules that may be applied are data range verification, mandatory data checks, and conflicting labeled data instance detection, for example.

Due to the dimensionality of the data and distributed data collection, data range verification may be difficult to perform on individual data components as they are received by the labeled data generation service. Data range verification cleaning rules may be used to achieve a final checkpoint where data in the labeled data instances may be verified to be within a range set forth by the cleaning rule. Other mechanisms, such as a semantic descriptor, may be used. A URI may be used to indicate where such information is provided. Such cleaning mechanisms may be applied to data in the labeled data instances in the set to ensure a certain degree of data integrity. Any labeled data instance detected to be in violation of such a rule may be flagged and sent to the target node, or may be deleted, as directed by the rule.

Mandatory data check cleaning rules may be used to ensure that the data sent to a target node contains all the pertinent data required by the algorithm. This may be important for cases in which the data set is used by a semi-supervised or unsupervised learning application. The labeled data generation service may perform a mandatory data check on each labeled data instance and may flag any data instances which do not contain the mandatory data before sending the data to the target node.

Another cleaning rule that a labeled data generation service may support is the detection of conflicting labeled data instances. In these cases, the labels that are generated conflict between two or more data instances that have the same inputs. For example, a conflict may be determined to exist if the inputs of two or more labeled data instances have the same values, but the expected outputs are vastly different. These labeled data instances may be flagged as being in conflict with each other and may be sent to the target node for further evaluation.

oneM2M Examples

A labeled data generation service of an IoT server may be used in a service layer technology such as oneM2M.

Figure 12:
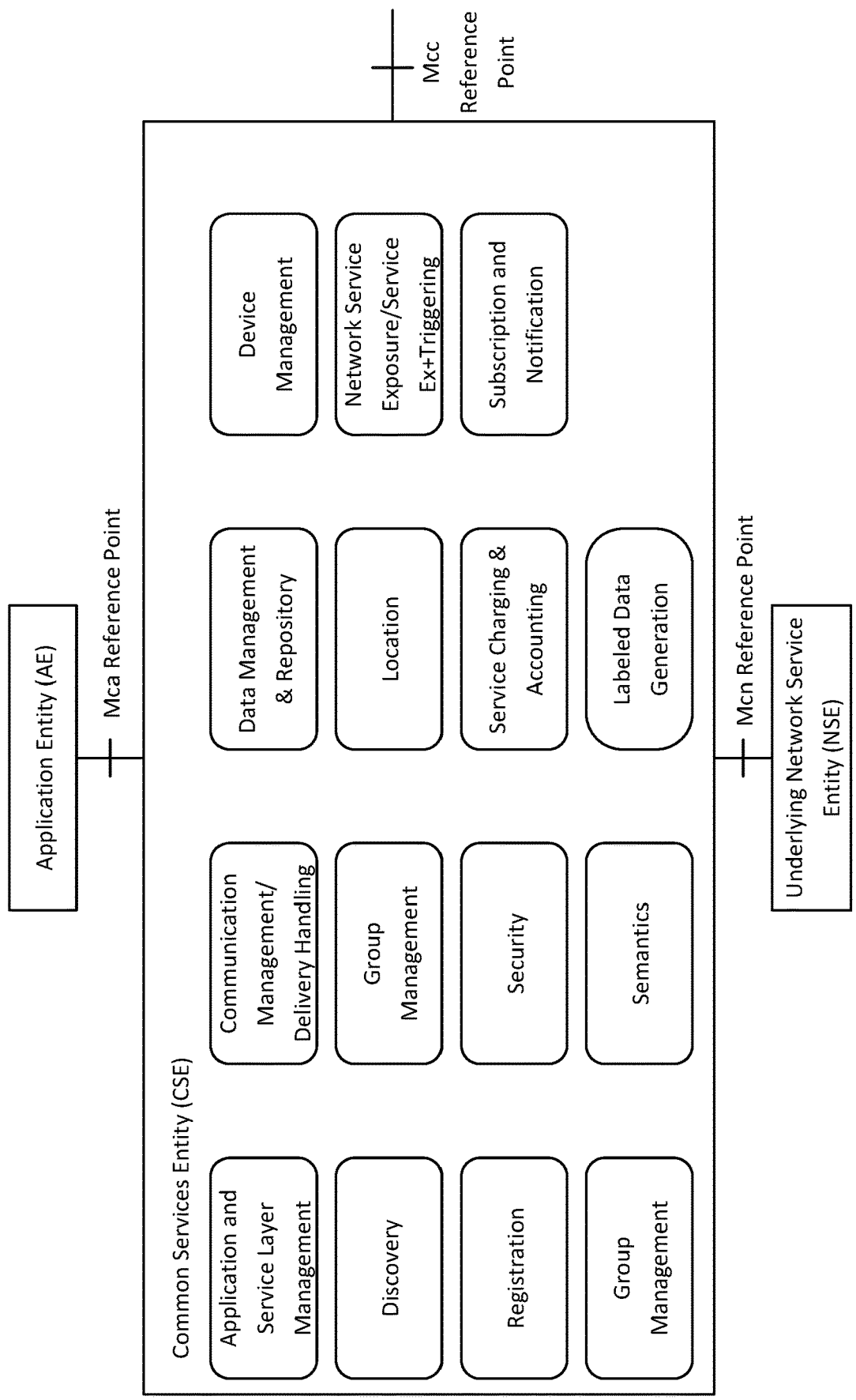
FIG. 12 illustrates an example oneM2M labeled data generation Common Services Function (CSF).

FIG. 12 illustrates a labeled data generation service realized as a Common Services Function (CSF). A oneM2M labeled data generation service CSF may support all of the functionalities described herein, e.g., as described in reference to FIGS. 3 to 11. The Labeled Data Generation CSF may interface with other CSFs within the CSE to generate labeled data instances. Alternatively, the Labeled Data Generation Service may be part of an existing CSF—for example the Data Management and Repository CSF.

OneM2M <labeledDataConfig> Resource

The <labeledDataConfig> resource type represents the labeled data configuration resource created in the CSE to generate labeled data instances for supervised learning applications. It may exist as a child resource of the following resources: <CSEBase>, <remoteCSE>, <AE>, <node>, and <group>. The <labeledDataConfig> resource may contain the resource specific attributes specified in Table 2 of the Appendix.

OneM2M <labeledDataInstance> Resource

The <labeledDataInstance> resource type represents a labeled data instance resource created in the CSE for supervised learning applications. The <labeledDataInstance> resource is a child resource of the parent resource specified by the dataSetURI attribute of the <labeledDataConfig> resource. The <labeledDataInstance> resource may contain the resource specific attributes specified in Table 3 of the Appendix. Alternatively, the information provided by Table 3 may be included in a <flexContainer> resource.

Cardiac Rehab Use Case Application

The <labeledDataConfig> resource is applied to the cardiac rehab use case as shown in Table 4 of the Appendix. Note this is a hypothetical description of the use case and is intended to demonstrate how the labeled data generation service may be used. The use case monitors certain characteristics of a cardiac patient's rehabilitation for a three-month period. The patient operates cse01 on his/her smartphone and the cardiac rehab center operates a second CSE cse02. There is mutual registration between cse01 and cse02 and the data collected on cse02 during exercise are mirrored onto cse01 under the remote cse02 resource on cse01. The <labeledDataConfig> resource is created on cse01 to generate labeled data instances on a daily basis for the 3-month period. Labeled data instances are saved in /cse01/labeledData/app1/q1 and also sent to the target node at www.example.com/app1. Note that some of the attribute values provided have been condensed for easier representation and understanding.

Inputs 1-3 are obtained from an application running on the patient's smartphone that provides appropriate values based on what the patient drinks (water, juice, soda, wine, beer, etc.) and eats (carbs, fats, protein, fried food, etc.). The app takes input on what is consumed and provides a "score" for each category. In addition, the app also tracks if the patient forgets to take prescribed medicines by communicating to a medicine dispenser. The app updates the corresponding resources three times a day and the labeled data generation service calculates a running sum of the values.

Inputs 4-12 are provided by the cardiac rehab center when the patient exercises. At the rehab center, the patient performs three different exercises while being monitored. Heart rate is constantly being monitored during exercise while blood pressure is taken at various times during the exercise program. The labeled data generation service records the maximum heart rate and the average blood pressure for each exercise. Finally, inputs 13-16 are provided from home medical devices that the patient owns. Both morning and evening heart rate and blood pressure readings are recorded.

The expected outputs may be generated as follows. For output1, if the heart rate of the patient during exercise exceeds 123, set value to 1; else 0. For output2, if the blood pressure of the patient during exercise falls below 90/60, set value to 1; else 0.

Output3 may note the number of times the patient experiences chest pains during the day. For example, this may be provided by a wearable device with a button the patient presses when experiencing chest pains.

User Interface

FIG. 13 illustrates an example user interface, whereby a form is presented to a user to create a labeled data configuration resource on a CSE. The form represents all the resource specific attributes defined for the aforementioned <labeledDataConfig> resource type in Table 2. A user may press any entry on the form to input data required for the corresponding attribute. New inputs and outputs may be added to the existing entries by pressing the corresponding buttons. When the form is completed, the user may press the Send button to transmit a <labeledDataConfig> create request to the CSE.

Figure 14A:
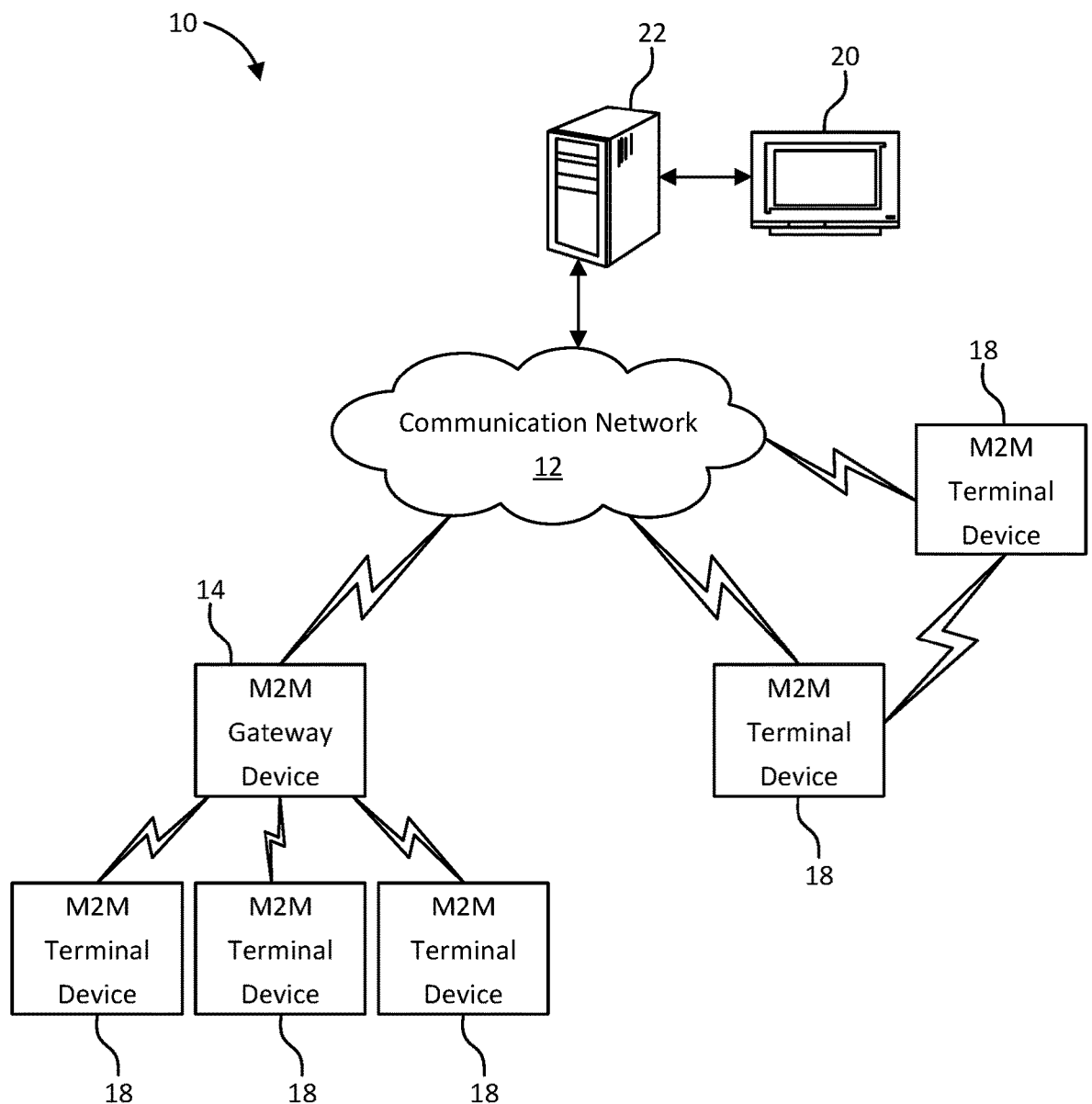
FIG. 14A is a system diagram of an example machine-to-machine (M2M), Internet of Things (IoT), or Web of Things (WoT) communication system in which one or more disclosed embodiments may be implemented.

FIG. 14A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 3-5 and 7-12 may comprise a node of a communication system, such as the ones illustrated in FIGS. 1, 3-5, and 7-12.

The service layer may be a functional layer within a network service architecture. Service layers are typically situated above the application protocol layer such as HTTP, CoAP, or MQTT and provide value added services to client applications. The service layer also provides an interface to core networks at a lower resource layer, such as for example, a control layer and transport/access layer. The service layer supports multiple categories of (service) capabilities or functionalities, including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. An M2M service layer can provide applications and/or various devices with access to a collection of or a set of the above mentioned capabilities or functionalities, supported by the service layer, which can be referred to as a CSE or SCL. A few examples include, but are not limited to, security, charging, data management, device management, discovery, provisioning, and connectivity management which can be commonly used by various applications. These capabilities or functionalities are made available to such various applications via APIs which make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

As shown in FIG. 14A, the M2M/IoT/WoT communication system 10 includes a communication network 12. The communication network 12 may be a fixed network (e.g., Ethernet, Fiber, ISDN, or PLC) or a wireless network (e.g., WLAN or cellular) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network.

As shown in FIG. 14A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, and devices) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. An M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, and Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 14B:
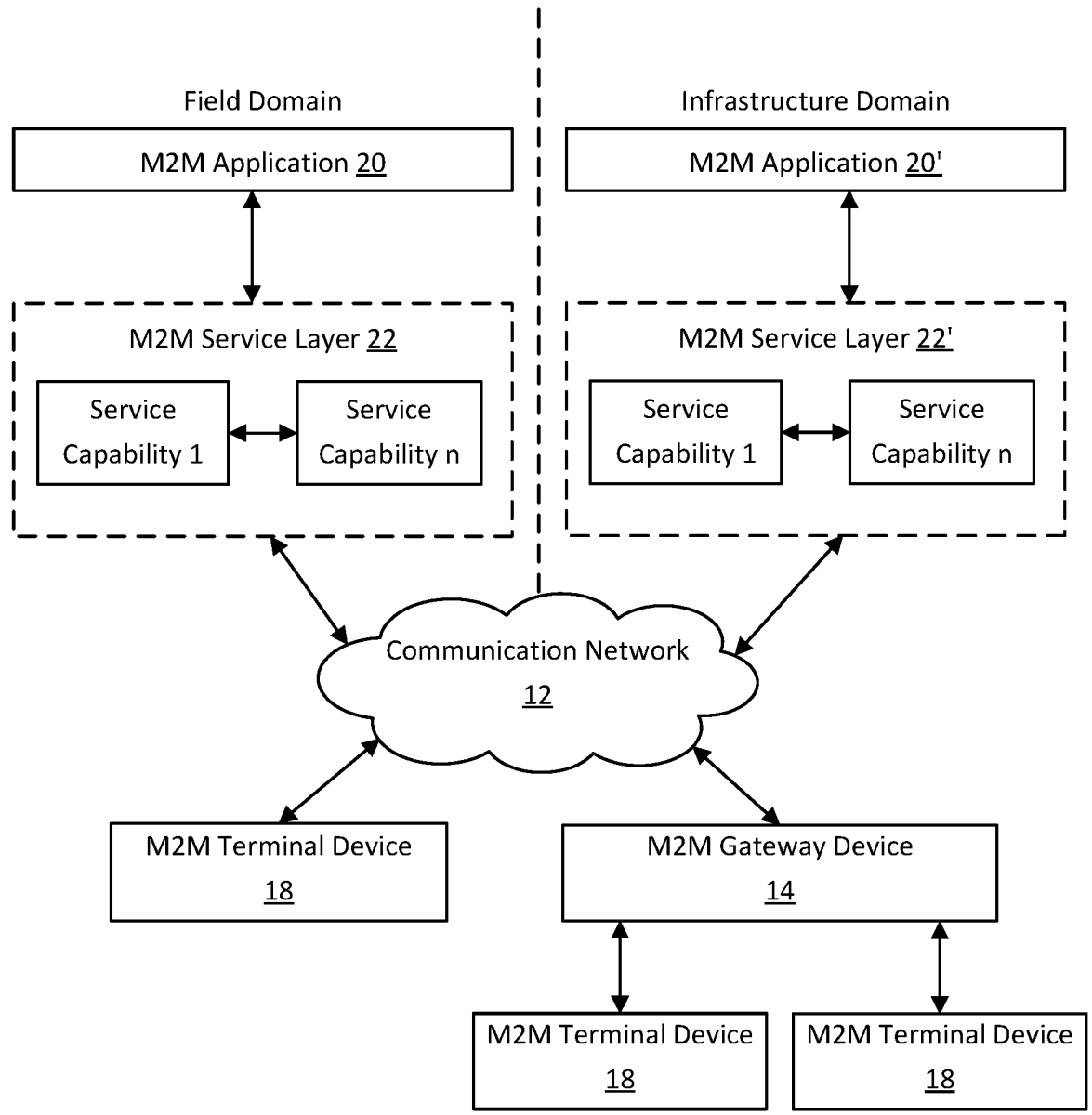
FIG. 14B is a system diagram of an example architecture that may be used within the M2M/IoT/WoT communications system illustrated in FIG. 14A.

Referring to FIG. 14B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication network 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways, and M2M devices. The M2M Service Layer 22' may interact with a Service Layer by a different service provider. The M2M Service Layer 22' may be implemented by one or more nodes of the network, which may comprise servers, computers, devices, or virtual machines (e.g., cloud computing/storage farms).

Referring also to FIG. 14B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, and service/device discovery. Essentially, these service capabilities free the applications of the burden of implementing these functionalities, thus simplifying application development, and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers, and other nodes of the system, supports functions such as data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 14B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)), and/or a network node (where it is referred to as a network SCL (NSCL)). The oneM2M Service Layer supports a set of Common Service Functions (CSFs) (e.g., service capabilities). An instantiation of a set of one or more particular types of CSFs is referred to as a Common Services Entity (CSE) which may be hosted on different types of network nodes infrastructure node, middle node, and application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software and computer-executable instructions) executing either on one or more standalone nodes in the network, including servers, computers, and other computing devices or nodes, or as part of one or more existing nodes. As an example, an instance of a Service Layer or component thereof may be implemented in the form of software running on a network node (e.g., server, computer, gateway, or device) having the general architecture illustrated in FIG. 14C or FIG. 14D described below.

Further, the methods and functionalities described herein may be implemented as part of an M2M network that uses a Service Oriented Architecture (SOA) and/or a Resource-Oriented Architecture (ROA) to access services.

Figure 14C:
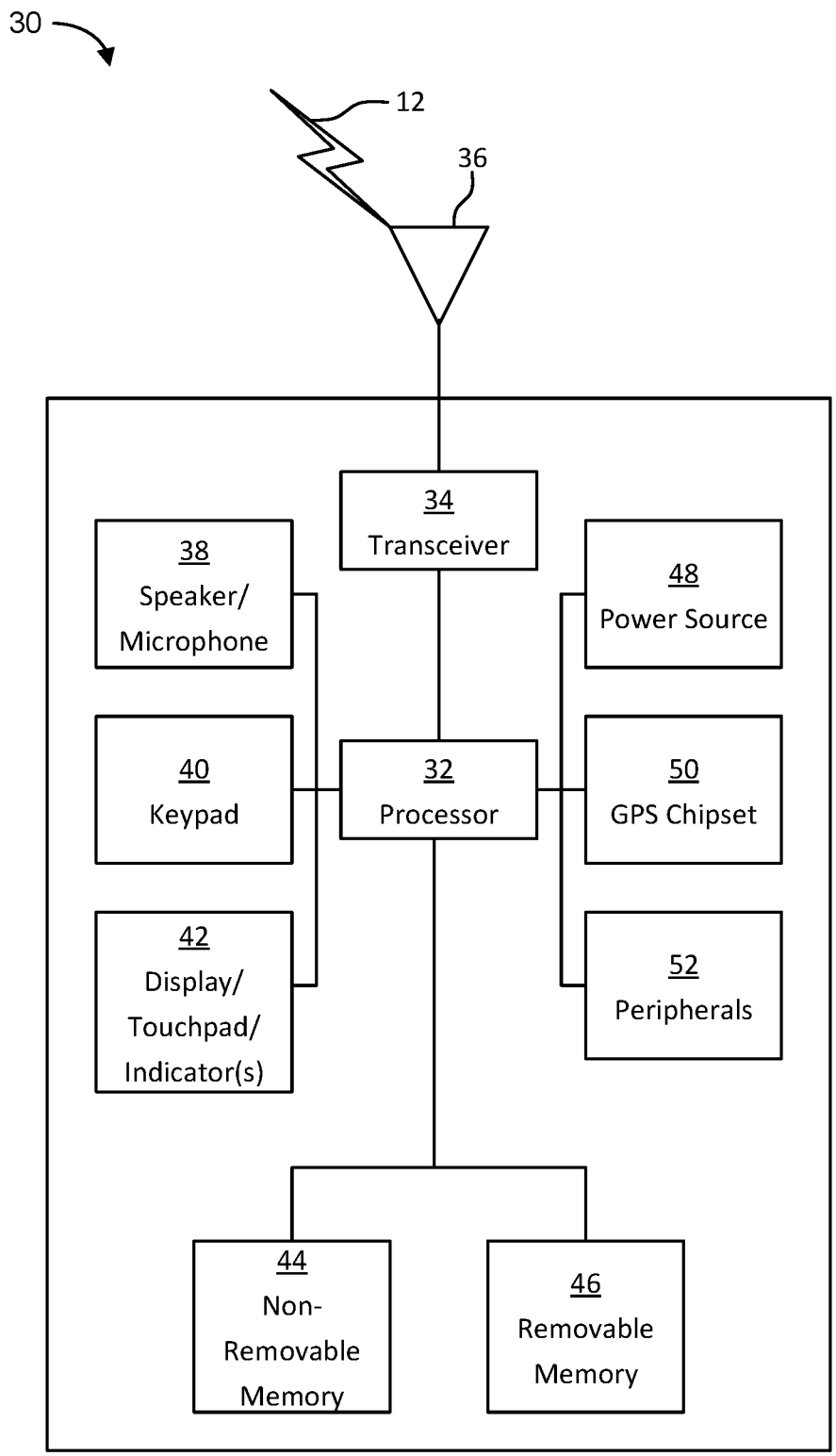
FIG. 14C is a system diagram of an example communication network node, such as an M2M/IoT/WoT device, gateway, or server that may be used within the communications system illustrated in FIGS. 14A and 14B.

FIG. 14C is a block diagram of an example hardware/software architecture of a node of a network, such as one of the clients, servers, or proxies illustrated in FIGS. 3-5 and 7-12, which may operate as an M2M server, gateway, device, or other node in an M2M network such as that illustrated in FIGS. 1, 3-5, and 7-12. As shown in FIG. 14C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements techniques for creating labeled data sets, e.g., in relation to the methods described in reference to FIGS. 3 and 7-11 or the data structures of FIGS. 1 and 6, Tables 1-4, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 14C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the techniques for creating labeled data sets herein, e.g., in relation to FIGS. 3 and 7-11, or in a claim. While FIG. 14C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), and lithium-ion (Li-ion)), solar cells, and fuel cells.

The processor 32 may also be coupled to the GPS chipset 50, which is configured to provide location information (e.g., longitude and latitude) regarding; the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other connection interfaces, a vibration device, a television transceiver, a hands free headset, a Bluetooth® module, a frequency modulated (FM) radio unit, a digital music player, a media player, a video game player module, and an Internet browser.

The node 30 may be embodied in other apparatuses or devices, such as a sensor, consumer electronics, a wearable device such as a smart watch or smart clothing, a medical or eHealth device, a robot, industrial equipment, a drone, or a vehicle such as a car, truck, train, or airplane. The node 30 may connect to other components, modules, or systems of such apparatuses or devices via one or more connection interfaces, such as an connection interface that may comprise one of the peripherals 52.

Figure 14D:
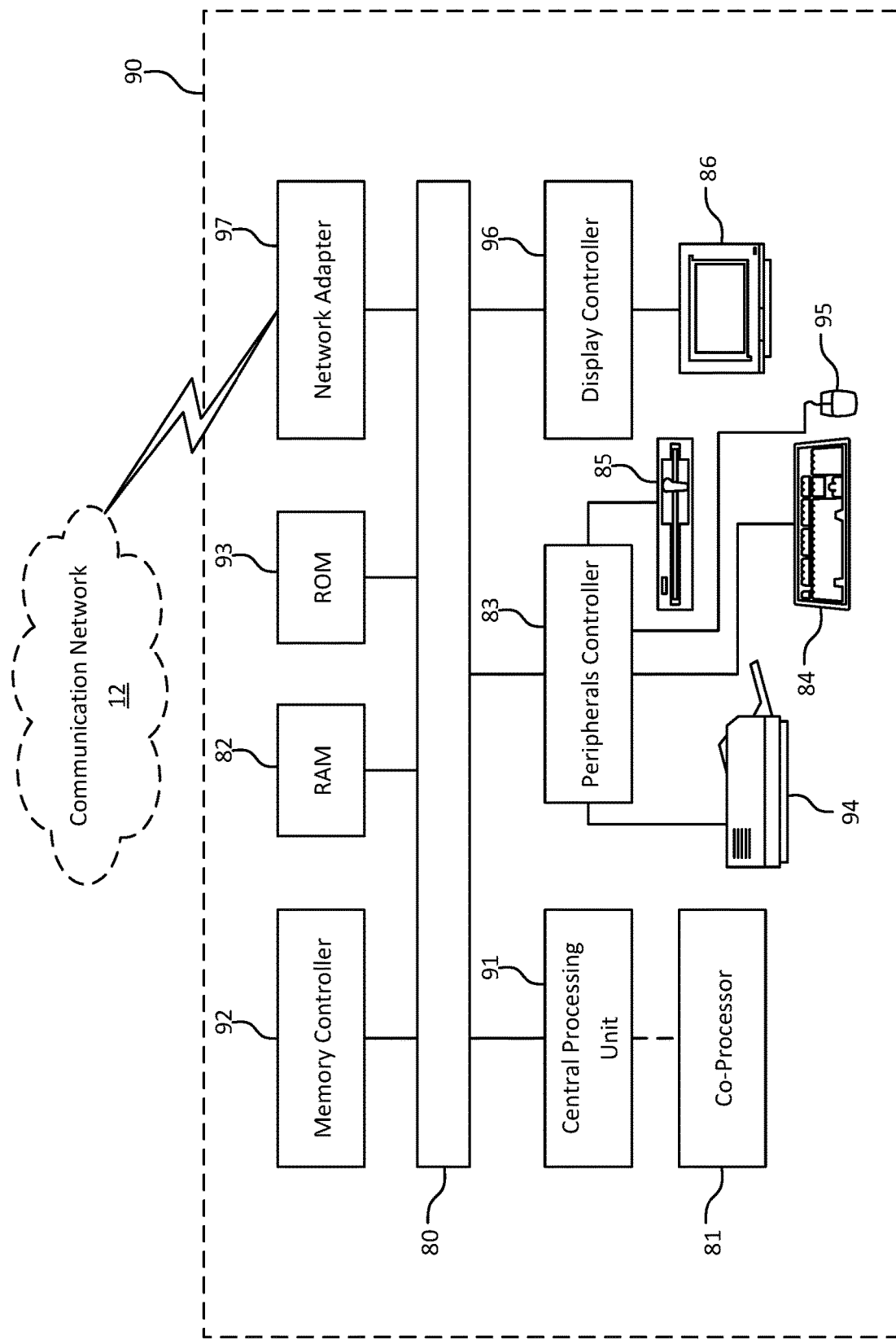
FIG. 14D is a block diagram of an example computing system in which a node of the communication system of FIGS. 14A and 14B may be embodied.

FIG. 14D is a block diagram of an exemplary computing system 90 which may also be used to implement one or more nodes of a network, such as the clients, servers, or proxies illustrated in FIGS. 3-5 and 7-12, which may operate as an M2M server, gateway, device, or other node in an M2M network such as that illustrated in FIGS. 1, 3-5, and 7-12.

Computing system 90 may comprise a computer or server and may be controlled primarily by computer readable instructions, which may be in the form of software, wherever or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, a gas plasma-based flat-panel display, or a touch panel. Display controller 96 includes electronic components required to generate a video signal that is sent to display 86.

Further, computing system 90 may contain communication circuitry, such as a network adaptor 97, that may be used to connect computing system 90 to an external communications network, such as network 12 of FIGS. 14A-14D, to enable the computing system 90 to communicate with other nodes of the network.

It is understood that any or all of the systems, methods and processes described herein may be embodied in the form of computer executable instructions (e.g., program code) stored on a computer-readable storage medium which instructions, when executed by a machine such as an apparatus of an M2M network, including, for example, an M2M server, gateway, device or the like, perform and/or implement the systems, methods and processes described herein. Specifically, any of the steps, operations, or functions described above may be implemented in the form of such computer executable instructions. Computer readable storage media include both volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

APPENDIX

TABLE 0

| | Abbreviations |
|---|---|
| ADN | Application Dedicated Node |
| AE | Application Entity |
| API | Application Programming Interface |
| ASN | Application Service Node |
| CRUD | Create, Retrieve, Update, Delete |
| CSE | Common Services Entity |
| CSF | Common Services Function |
| GUI | Graphical User Interface |
| IN | Infrastructure Node |
| IoT | Internet of Things |
| IP | Internet Protocol |
| LUT | Lookup Table |
| M2M | Machine-to-Machine |
| ML | Machine Learning |
| MN | Middle Node |
| NoDN | Non-OneM2M Node |
| URI | Uniform Resource Identifier |
| URL | Uniform Resource Locator |
| WoT | Web-of-Things |

TABLE 1

| Labeled Data Configuration Resource | |
|---|---|
| Parameter Name | Description |
| activate | Specifies a time when the labeled data generation service is to start collecting and generating labeled data instances. Alternatively, the labeled data generation service may be triggered by the occurrence of event(s) in the IoT system or through receiving notifications. |
| targetNodes | Specifies the URIs of target nodes where each data instance may be sent to. The target nodes may also provide control information to components of the labeled data generation service. The control information may be used to extend support for the labeled data generation service for cases in which the data and/or format is not recognized by the service. |
| externalNodes | Specifies one or more external nodes where the labeled data generation service may contact to obtain pre-processing or data transformation functions it may not have available internally. In some cases, the target node and the external node may be the same entity. |

TABLE 1-continued

Labeled Data Configuration Resource

| Parameter Name | Description |
| --- | --- |
| dataSetURI | Specifies the URI. where the generated labeled data instances may be saved within an IoT server. |
| numInstances | Specifies the number of labeled data instances that need to be generated by the labeled data generation service before it deactivates. This parameter may be used by the labeled data generation service to determine when to apply cleaning rules on the labeled data set. |
| cleaningRules | After the labeled data instances are created, cleaning rules may be applied to the labeled data set to ensure data meets the requirement of the supervised learning algorithm. Example rules may be to remove duplicates, verify data ranges, monitor for mandatory data, or detect conflicting data instances |
| expiration Time | An expiration time may be specified to indicate when the labeled data generation service deactivates. Any incomplete labeled data instance may be discarded during deactivation. If both numInstances and expirationTime are specified, then the labeled data generation service may deactivate service based on whichever comes first. |
| dataSource | Specifies whether the data source is dynamic or static. For dynamic data sources, the labeled data generation service may need to monitor resources in the IoT system and collect them as they become available. For static data sources, the labeled data generation service may need to interface to an entity that provides historical data, such as another service within the IoT server, or from a database where the data is stored. |
| inputDimension | Specifies the number of input dimensions required for one labeled data instance. |
| inputList | Provides a list of URIs and/or identifiers that identifies the input data to be collected for the supervised learning algorithm. The URIs or identifiers in this list may be targeted to any resource in the IoT system wherein the IoT server has access to. Alternatively, this parameter may be an expression that provides triggering conditions for the data collectors to determine what the input data is. |
| inputSource | Provides a list of identifiers which directs the flow of data through the labeled data generation service. This parameter provides the labeled data generator information on how to route data processing for data in the input data collector path within the service. |
| inputTimeRequirement | Provides a list of timing or event requirements for each input found in inputlist. The timing requirement may be relative to either the labeled data instance time when it was created or relative to the availability of one of the inputs in inputlist. This requirement may also be expressed as an expression that identifies an event that must occur before the input is captured. For example, input A must be captured before input B. |
| inputDataExtraction | Provides a list of data extraction identifiers that corresponds to each input in the inputList to inform the data collector on which data element to extract from the resource representation. For cases in which the inputList URI specifies the exact data element of a resource, this parameter may be specified as null. This list has a one-to-one correspondence with each item in the inputList, e.g., there are the same number of elements in the inputDataExtraction list as that of inputList. |
| inputUnits | Specifies the required units for each input listed in inputList. Where possible, the data collectors may examine meta-data from the resource representation to make a determination on whether to perform unit conversions. |
| inputPreProcessing | Provides a list of pre-processing functions which may apply to the corresponding inputs found in inputList. Some examples of pre-processing functions are: measurement unit conversion, data type conversion, and data aggregation functions such as sum, average, minimum, maximum, count, etc. For cases in which no pre-processing is required, the parameter may be specified as null. This list has a one-to-one correspondence with each item in the inputList, e.g., there are the same number of elements in the inputPreProcessing list as that of inputList. |
| inputDataTransform | Provides a list of data transform functions which may apply to the corresponding inputs found in inputList. Some examples of data transform functions are: normalization, standardization, binning, logarithmic, exponential, square root, and clamp. For cases in which no data transformation is required, the parameter may be specified as null. This list has a one-to-one correspondence with each item in the inputList, e.g., there are the same number of elements in the inputDataTransform list as that of inputList. |
| outputDimension | Specifies the number of expected output dimensions to generate for one labeled data instance. |
| labeledDataExpression | Provides a list of expressions that are used to generate labeled data based on the state of resources in the IoT system. The list has a one-to-one correspondence with the outputDimension parameter, e.g., there are the same number of elements in the labeledDataExpression list as specified by outputDimension. |
| labeledDataOutput | Provides an indication of what elements of the labeled data instance are sent to the target node. Some examples may include only required data, required data with instance identifier, or required data, instance identifier and all time stamps. |
| labeledDataSoure | Similar to inputSource parameter but applied to expected output data. |
| outputTimeRequirement | Similar to inputTimeRequirement parameter but applied to expected output data and may be relative to elements in either inputList or labeledDataExpression. This parameter may be used to provide implicit linking information between input data and expected output data. The generation of an expected output may depend on the capture of one or more input data before the expected output is generated in order to be valid. The detection of these events (capture of input data) may be a requirement before this expected output may be generated. |
| outputUnits | Similar to inputUnits parameter but applied to expected outputs data. |
| outputPreProcessing | Similar to inputPreProcessing parameter but applied to expected output data. |
| outputDataTransform | Similar to inputDataTransform parameter but applied to expected output data. |

TABLE 2

Attributes of <labeledDataConfig> resource

| Attributes of <labeledDataConfig> | Multiplicity | RW/ RO/ WO | Description | <labeledDataConfigAnnc> Attributes |
|---|---|---|---|---|
| Universal and common attributes | * | * | See clause 9.6.1.3 of [1] | OA |
| activate | 1 | RW | Specifies the condition of how the labeled data generation service is started as a 2-tuple: <enum>, <strong>. The conditions are: 0, [absolute time, periodicity]: Specifies a time to activate the labeled data generation service. For recurrent operations, the following string is added after the time: continuous, daily, weekly, monthly, or yearly. Examples include: 1. 20181023T070000, daily 2. 20171108T000000, continuous 1, [event expression]: specifies an event which triggers the start of the service. The expression may be algebraic or the partial address of a <action> resource. 2, [notification ID]: specifies the start of the service based on receiving a notification. | OA |
| deactivate | 0 . . . 1 | RW | Specifies the condition to deactivate the service. This may be based on either the number of labeled data instances generated or on an expiration time. After the number of labeled data instances has been generated or the expiration time has been reached, the labeled data generation service automatically deactivates. Any incomplete labeled data instance is discarded during deactivation. If activate is specified with a recurrence of "continuous", then this attribute is ignored. | OA |
| targetNode | 1 | RW | Specifies the URI of a node the labeled data instance is sent to once all data elements are available. | OA |
| dataSetURI | 0 . . . 1 | RW | Specifies the URI where the generated labeled data instance may also be saved within the CSE. | OA |
| numinsiances | 1 | RW | Specifies the number of labeled data instances to generate for a labeled data set. | OA |
| cleaningRules | 0 . . . 1 (L) | RW | Specifies rules used to post-process a labeled data set (when the numInstances is reached). Some example rules are: A: Remove duplicate labeled data instances; B: Verify data ranges; may also specify the range or some URI where the range may be retrieved; C: Check whether mandatory data is present; includes a list of input or output that must appear in a labeled data instance; and D: Detect data instance conflicts; if data for inputs are the same but outputs are different, flag the data instances before sending to targetNode. Note that one or more rules may be specified. | OA |
| dataSource | 1 | RW | Specifies whether the data source is dynamic or static. Dynamic data sources are collected from the oneM2M system as data provided to a CSE. Static data sources represent historical data provided in a database or through another CSF within the CSE. | OA |
| inputDimension | 1 | RW | Specifies the number of input elements saved to the labeled data instance. This number determines how many of the inputN attributes are allowed when creating this resource. | OA |
| [inputN] | 1 | RW | This is a custom attribute that depends on the inputDimension attribute. The attribute name starts with input1 and continues sequentially until numInputs. The attribute contains the following 6-tuple: 1. URI: The URI of the resource to monitor for input data; can also be a resource identifier 2. attribute name: attribute of the resource where data is retrieved for input 3. time requirement: a time relative to some other resource that must be met to qualify an input as valid; consists of partial address and a relative time. For example, if two inputs must occur in sequence and are separated by some time duration, it may be specified by this parameter. 4. unit: unit of measurement required for the input data element 5. pre-processing: function used to pre-process the input; can be compound functions or null for no function 6. transform: function used to transform the input, can be null for no function | OA |
| outputDimension | 1 | RW | Specifies the number of expected output elements saved to the labeled data instance. This number determines how many of the outputN attributes are allowed when creating this resource. | OA |
| [outputN] | 1 | RW | This is a custom attribute that depends on the outputDimension attribute. The attribute name starts with output1 and continues sequentially until numOutputs. The attribute contains the following 5-tuple: | OA |

TABLE 2-continued

Attributes of <labeledDataConfig> resource

| Attributes of <labeledDataConfig> | Multiplicity | RW/ RO/ WO | Description | <labeledDataConfigAnnc> Attributes |
|---|---|---|---|---|
| | | | 1. labeled data expression: a complex expression describing how to generate labeled data from data available in the system. If the expression identifies a singular resource by a URI, the value of that resource attribute determines the value for the corresponding output of the labeled data instance, Otherwise, the expression may contain a logical expression comparing resources against some threshold value.<br>2. time requirement: a time relative to some resource that must be met to qualify an input as valid for generating the expected output; consists of partial address and a relative time.<br>3. unit: unit of measurement required for the expected output data element<br>4. pre-processing: function used to pre-process the expected output; can be compound functions or null for no function<br>5. transform: function used to transform the expected output; can be null for no function | |
| dataOutput | 1 | RW | Specifies the data elements to include in the labeled data instance sent to a target node:<br>0 = only required data;<br>1 = required data and data instance ID; or<br>2 = required data, data instance ID, and time stamp. | OA |

TABLE 3

Attributes of <labeledDataInstance> resource

| Attributes of <labeledDataInstance> | Multiplicity | RW/ RO/ WO | Description | <labeledDataInstanceAnnc> Attributes |
|---|---|---|---|---|
| Universal and common attributes | * | * | See clause 9.6.1.3 of [1] | OA |
| identifier | 1 | RW | Specifies an identifier for this labeled data instance | OA |
| [inputN] | 1 | RW | This is a custom attribute that depends on the inputDimension attribute of the <labeledDataConfig> resource and specifies an input element of the labeled data instance that corresponds to the inputN specified in the <labeledDataConfig> resource.<br>A 2-tuple consisting of:<br>1. value for inputN of the labeled data instance; and<br>2. time stamp for when inputN was collected;<br>this value may be null when the dataSource attribute of the <labeledDataConfig> resource is static. | OA |
| [outputN] | 1 | RW | This is a custom attribute that depends on the outputDimension attribute of the <labeledDataConfig> resource and specifies an expected output element of the labeled data instance that corresponds to the outputN specified in the <labeledDataConfig> resource. A 2-tuple consisting of:<br>1. value for outputN of the labeled data instance; and<br>2. time stamp for when outputN was collected;<br>this value may be null when the dataSource attribute of the <labeledDataConfig> resource is static. | OA |

TABLE 4

<labeledDataConfig> Example for Cardiac Rehab Use Case

| Attributes of <labeledDataConfig> | Attribute Value |
|---|---|
| activate | 20181023T000000, daily |
| targetNode | http://www.example.com/app1 |
| dataSetURI | /cse01/labeledData/app1/q1 |
| dataSource | 0 (dynamic) |

TABLE 4-continued

<labeledDataConfig> Example for Cardiac Rehab Use Case

| Attributes of <labeledDataConfig> | Attribute Value |
|---|---|
| nunInstances | 90 |
| cleaningRules | {A, D} |
| inputDimension | 16 |
| [input1] | /cse01/dailyDrinks/latest, content, null, sum( ), null |
| [input2] | /cse01/dailyEats/latest, content, null, sum( ), null |
| [input3] | /cse01/dailyMeds/latest, content, null, sum( ), null |
| [input4] | /cse01/cse02/patient1/exercise1Time/latest, content, null, null, null |
| [input5] | /cse01/cse02/patient1/exercise1HR/latest, content, null, max( ), null |
| [input6] | /cse01/cse02/patient1/exercise1BP/latest, content, null, avg( ), null |
| [input7] | /cse01/cse02/patient1/exercise2Time/latest, content, null, null, null |
| [input8] | /cse01/cse02/patient1/exercise2HR/latest, content, null, max( ), null |
| [input9] | /cse01/cse02/patient1/exercise2BP/latest, content, null, avg( ), null |
| [input10] | /cse01/cse02/patient1/exercise3Time/latest, content, null, null, null |
| [input11] | /cse01/cse02/patient1/exercise3HR/latest, content, null, max( ), null |
| [input12] | /cse01/cse02/patient1/exercise3BP/latest, content, null, avg( ), null |
| [input13] | /cse01/morningHR/latest, content, null, null, null |
| [input14] | /cse01/eveningHR/latest, content, null, null, null |
| [input15] | /cse01/morningBP/latest, content, null, null, null |
| [input16] | /cse01/eveningBP/latest, content, null, null, null |
| outputDimension | 3 |
| [output1] | {if [(input5 > 123) or (input8 > 123) or (input1 > 123)]; 1; 0}, null, null, null |
| [output2] | {if [(input6 < '90/60') or (input9 < '90/60') or (input11 < '90/60')]; 1; 0}, null, null, null |
| [ouput3] | {/cse01/chestPains/number}, null, sum( ), null |

We claim:

1. An apparatus comprising one or more processors and memory storing computer-executable instructions which, when executed by the one or more processors of the apparatus, cause the apparatus to perform operations comprising:
    maintaining a configuration, the configuration comprising design information for a labeled data set, the labeled data set comprising a plurality of labeled data instances, wherein each labeled data instance comprises a plurality of data values, the data values comprising one or more data inputs and one or more expected data outputs associated with the one or more data inputs;
    acquiring a plurality of raw data inputs from data sources;
    processing, according to the configuration, the raw data inputs to create processed data inputs, wherein the processing of the raw data inputs comprises pre-processing based on first parameters indicated in the configuration and data transformation based on second parameters indicated in the configuration;
    generating, according to the configuration, labeled data instances, wherein a labeled data instance comprises one or more processed data inputs and one or more expected data output values;
    storing the labeled instances in a labeled data set; and
    sending the labeled data set to a repository.

2. The apparatus of claim 1, wherein, for one or more raw data inputs, the processing of the raw data inputs comprises converting or scaling each of the raw data inputs to create a processed data input value for each raw data input.

3. The apparatus of claim 1, wherein, for one or more raw data inputs, the processing of the raw data inputs comprises scaling a processed data input value for each of the raw data inputs in accordance with one or more statistical observations of the plurality of raw data inputs.

4. The apparatus of claim 1, wherein, for one or more sets of raw data inputs, the processing of the raw data inputs comprises deriving a processed data input value for each plurality of raw data inputs in accordance with one or more statistical observations of the plurality of raw data inputs.

5. The apparatus of claim 1, wherein the labeled data instances are generated with data cleaning based on one or more cleaning rules indicated by the configuration.

6. The apparatus of claim 5, wherein the data cleaning comprises one or more of:
    identifying duplicate labeled data instances in the labeled data set;
    removing the identified duplicate labeled data instances from the labeled data set;
    verifying data is valid from the labeled data set;
    monitoring for mandatory data in the labeled data set;
    detecting conflicts with data instances in the labeled data set; and
    informing the repository of the identified duplicate labeled data instances.

7. The apparatus of claim 1, wherein:
    the configuration comprises an output time requirement parameter; and
    the operations further comprise acquiring an expected data output in accordance with the output time requirement parameter.

8. The apparatus of claim 1, wherein the pre-processing comprises one or more of: measurement unit conversion, data type conversion, or data aggregation.

9. The apparatus of claim 8, wherein the data aggregation comprises one or more of: a sum, an average, a minimum, a maximum, or a count.

10. The apparatus of claim 1, wherein the data transformation comprises one or more of: normalization, standardization, or binning.

11. A method comprising:
    maintaining a configuration, the configuration comprising design information for a labeled data set, the labeled data set comprising a plurality of labeled data instances, wherein each labeled data instance comprises a plurality of data values, the data values comprising one or more data inputs and one or more expected data outputs associated with the one or more data inputs;

acquiring a plurality of raw data inputs from data sources;

processing, according to the configuration, the raw data inputs to create processed data inputs, wherein the processing of the raw data inputs comprises pre-processing based on first parameters indicated in the configuration and data transformation based on second parameters indicated in the configuration;

generating, according to the configuration, labeled data instances, wherein a labeled data instance comprises one or more processed data inputs and one or more expected data output values;

storing the labeled data instances in a labeled data set; and sending the labeled data set to a repository.

12. The method of claim 11, wherein, for one or more raw data inputs, the processing of the raw data inputs comprises converting or scaling each of the raw data inputs to create a processed data input value for each raw data input.

13. The method of claim 11, wherein, for one or more raw data inputs, the processing of the raw data inputs comprises scaling a processed data input value for each of the raw data inputs in accordance with one or more statistical observations of the plurality of raw data inputs.

14. The method of claim 11, wherein, for one or more sets of raw data inputs, the processing of the raw data inputs comprises deriving a processed data input value for each plurality of raw data inputs in accordance with one or more statistical observations of the plurality of raw data inputs.

15. The method of claim 11, wherein the labeled data instances are generated with data cleaning based on one or more cleaning rules indicated by the configuration.

16. The method of claim 15, wherein the data cleaning comprises one or more of:
identifying duplicate labeled data instances in the labeled data set;
removing the identified duplicate labeled data instances from the labeled data set;
verifying data is valid from the labeled data set;
monitoring for mandatory data in the labeled data set;
detecting conflicts with data instances in the labeled data set; and
informing the repository of the identified duplicate labeled data instances.

17. The method of claim 11, wherein:
the configuration comprises an output time requirement parameter; and
the operations further comprise acquiring an expected data output in accordance with the output time requirement parameter.

18. The method of claim 11, wherein the pre-processing comprises one or more of: measurement unit conversion, data type conversion, or data aggregation.

19. The method of claim 18, wherein the data aggregation comprises one or more of: a sum, an average, a minimum, a maximum, or a count.

20. The method of claim 11, wherein the data transformation comprises one or more of: normalization, standardization, or binning.

* * * * *